(12) United States Patent
Jie et al.

(10) Patent No.: US 12,263,699 B2
(45) Date of Patent: Apr. 1, 2025

(54) MULTI-PEDAL-CONTROLLED CASTER AND METHOD FOR USING CASTER

(71) Applicant: Fujian Secure Medical Technology CO., LTD, Fuzhou (CN)

(72) Inventors: Yebing Jie, Fuzhou (CN); Xiaolin Shen, Fuzhou (CN)

(73) Assignee: Fujian Secure Medical Technology CO., LTD, Fuzhou (CN)

( * ) Notice: Subject to any disclaimer, the term of this patent is extended or adjusted under 35 U.S.C. 154(b) by 0 days.

(21) Appl. No.: 18/269,612

(22) PCT Filed: Mar. 3, 2023

(86) PCT No.: PCT/CN2023/079479
§ 371 (c)(1),
(2) Date: Jun. 26, 2023

(87) PCT Pub. No.: WO2024/148668
PCT Pub. Date: Jul. 18, 2024

(65) Prior Publication Data
US 2024/0375435 A1   Nov. 14, 2024

(30) Foreign Application Priority Data
Jan. 12, 2023 (CN) .......................... 202310039178.6

(51) Int. Cl.
*B60B 33/02*    (2006.01)
*B60B 33/00*    (2006.01)

(52) U.S. Cl.
CPC ........ *B60B 33/021* (2013.01); *B60B 33/0078* (2013.01); *B60B 33/02* (2013.01);
(Continued)

(58) Field of Classification Search
CPC ..... B60B 33/021; B60B 33/02; B60B 33/025; B60B 33/0086; B60B 33/0078
(Continued)

(56) References Cited

U.S. PATENT DOCUMENTS 7,926,145 B2 *  4/2011  Liao .................... B60B 33/0049
                                                      188/19
8,087,127 B2 *  1/2012  Dayt ................... B60B 33/0086
                                                      16/21
(Continued)

FOREIGN PATENT DOCUMENTS

CN       102602241 B      1/2014
CN       103419564 B      9/2015
WO    WO-2021203806 A1 * 10/2021   ......... B60B 33/0084

*Primary Examiner* — Jeffrey O'Brien
(74) *Attorney, Agent, or Firm* — Bayramoglu Law Offices LLC

(57) ABSTRACT

A multi-pedal-controlled caster and a method for using the caster are provided. The multi-pedal-controlled caster includes a main body support, a connecting rod, an orientation mechanism, a braking mechanism, a reset mechanism, a first inner tooth member, a second inner tooth member, a pair of wheel members and three elastic members, where the main body support is relatively rotatable and is combined with the connecting rod, and the first inner tooth member and the second inner tooth member are fixedly mounted on the connecting rod. A multifunctional pedal is treaded to push a first warping plate to make the first warping plate clamped into a first recess portion of the first inner tooth member, so that the caster can run in an orientated manner; and the multifunctional pedal is treaded again to push an auxiliary braking member.

22 Claims, 18 Drawing Sheets

(52) U.S. Cl.
CPC ........ *B60B 33/025* (2013.01); *B60B 33/0042* (2013.01); *B60B 33/0086* (2013.01)

(58) Field of Classification Search
USPC .............................................. 16/35 R, 35 D
See application file for complete search history.

(56) References Cited

U.S. PATENT DOCUMENTS

| | | | | |
|---|---|---|---|---|
| 8,302,257 | B2* | 11/2012 | Lin ..................... | B60B 33/0057 16/48 |
| 8,819,894 | B2* | 9/2014 | Hamasaki ............. | B60B 33/025 16/35 R |
| 9,038,785 | B2* | 5/2015 | Lin ...................... | B60B 33/025 16/35 R |
| 9,038,786 | B2* | 5/2015 | Lin ..................... | B60B 33/0086 188/1.12 |
| 9,090,125 | B2* | 7/2015 | Block ................... | B60B 33/021 |
| 9,211,762 | B1* | 12/2015 | Tsai .................... | B60B 33/0042 |
| 9,302,544 | B2* | 4/2016 | Jie ...................... | B60B 33/0078 |
| 2009/0276977 | A1* | 11/2009 | Liao ................... | B60B 33/0049 16/35 R |
| 2010/0170061 | A1* | 7/2010 | Lin .................... | B60B 33/0049 16/35 R |

\* cited by examiner

MULTI-PEDAL-CONTROLLED CASTER AND METHOD FOR USING CASTER

CROSS REFERENCE TO THE RELATED APPLICATIONS

This application is the national phase entry of International Application No. PCT/CN2023/079479, filed on Mar. 3, 2023, which is based upon and claims priority to Chinese Patent Application No. 202310039178.6, filed on Jan. 12, 2023, the entire contents of which are incorporated herein by reference.

TECHNICAL FIELD

The present invention relates to a multi-pedal-controlled caster, in particular to a medical caster applicable to three-pedal function control and a method for using the caster.

BACKGROUND

With the development of the society, various medical casters have appeared one after another, there are more and more requirements for the function set of the casters, and multi-pedal-controlled casters are produced to meet the market demand.

At present, the multi-pedal-controlled casters in the market achieve selection of an orientation function or a braking function by treading pedals having different functions, for example, a Chinese patent multifunctional caster structure (with the publication number of CN103419564B), a longitudinal rod group thereof drives a clamping group to be clamped with or separated from a clamping member fixedly arranged on a rotating seat and drives a braking swing member to be clamped with or separated from a wheel body pivoted to the rotating seat, so that a caster can perform steering, orientation and braking functions according to requirements; another example is a Chinese patent dual-pedal synchronous full-braking caster (with the publication number of CN102602241B), the caster adopts the dual-pedal synchronous full-braking design, and full freedom and full braking operations can be completed no matter which pedal is treaded.

However, the above-mentioned casters have the defects that the pedals for achieving different functions are too close to each other, and the problem that the pedals are treaded in a mixed manner or are not treaded easily appears easily.

SUMMARY

The present invention aims to provide a multi-pedal-controlled caster and a method for using the caster, the selection of different functions can be achieved by treading a multifunctional pedal, releasing can be achieved by treading reset pedals so as to return to an original universal travel state, and there is no need to worry about mixed treading of the reset pedals.

In order to solve the above-mentioned problem, the multi-pedal-controlled caster in the present invention includes:

a main body support, a connecting rod, an orientation mechanism, a braking mechanism, a reset mechanism, a pair of wheel members and three elastic members, where the main body support is relatively rotatably connected and combined with the connecting rod, one end of the connecting rod extends into the main body support, the end of the connecting rod that extends into the main body support is fixedly sleeved with a first inner tooth member and a second inner tooth member, a first recess portion is formed in the first inner tooth member, and a second recess portion is formed in the second inner tooth member;

the orientation mechanism includes a multifunctional pedal and a first warping plate, one end of the multifunctional pedal has a treading portion, and a first pushing portion and a first abutting portion are formed at the other end of the multifunctional pedal;

one end of the first warping plate is a first abutted portion, a first clamping portion is formed at the other end of the first warping plate, the first pushing portion of the multifunctional pedal abuts against the first abutted portion, the first clamping portion faces the first recess portion of the first inner tooth member, and when the first warping plate swings, the first clamping portion is clamped into or separated from the first recess portion;

the braking mechanism includes the multifunctional pedal, an auxiliary braking member and a second warping plate, one end of the auxiliary braking member has a third abutted portion, and the third abutted portion abuts against a third abutting portion of the multifunctional pedal; a second abutting portion is formed on one side of the other end of the auxiliary braking member, the auxiliary braking member has a second pushing portion located and formed on the other side of the second abutting portion, and the auxiliary braking member and the multifunctional pedal are coaxial and are pivoted to the main body support by means of a third pivot member;

a second abutted portion is formed at one end of the second warping plate, the second pushing portion of the auxiliary braking member abuts against the second abutted portion, a second clamping portion is formed at the other end of the second warping plate, the second clamping portion faces the second recess portion of the second inner tooth member, when the second warping plate swings, the second clamping portion is clamped into or separated from the second recess portion, and each of two sides of the second warping plate extends to form a third clamping portion;

the reset mechanism includes an oriented reset pedal and a brake releasing reset pedal which are arranged side by side, the two reset pedals of the reset mechanism are coaxial and are pivoted to the main body support by means of a second pivot member, a reset treading portion is respectively arranged at one end of each of the two reset pedals, a fourth abutting portion is formed at the other end of the oriented reset pedal, a fifth abutting portion is formed at the other end of the brake releasing reset pedal, and the fourth abutting portion and the fifth abutting portion face and push the first abutting portion and the second abutting portion;

the pair of wheel members includes a first side wheel and a second side wheel, a limiting gear is formed on each of the sides of the first side wheel and the second side wheel that face each other, the limiting gear has a plurality of tooth grooves, the third clamping portions of the second warping plate face the plurality of tooth grooves, and when the second warping plate swings to different positions, the third clamping portions are buckled into the tooth grooves, or the third clamping portions are separated from the tooth grooves; and the three elastic members includes a first elastic member, a second elastic member and a third elastic member, the first elastic member is coaxial with the first warping plate and the second warping plate, and one end thereof abuts against the second warping plate; the second elastic member is coaxial with the two reset pedals, one end thereof penetrates through the two reset pedals respectively, and the other end abuts against the first warping plate; and the third elastic member penetrates through the coaxial multifunctional pedal and auxiliary braking member, one end thereof abuts against the multifunctional pedal, and the other end abuts below the second warping plate.

The method for using the multi-pedal-controlled caster in the present invention includes:

realizing an orientation function: treading the multifunctional pedal to make the multifunctional pedal rotate with the third pivot member serving as a pivot, then pushing the first warping plate to make the first warping plate rotate synchronously, and then making the first clamping portion of the first warping plate clamped into the first recess portion of the first inner tooth member;

realizing a braking function: treading the multifunctional pedal to make the multifunctional pedal rotate with the third pivot member serving as a pivot, then pushing the auxiliary braking member to make the auxiliary braking member rotate synchronously with the third pivot member serving as the pivot, further pushing the second warping plate to make the second warping plate rotate synchronously, and then making the second clamping portion of the second warping plate clamped into the second recess portion of the second inner tooth member and making the third clamping portions of the second warping plate clamped into the tooth grooves of the limiting gears;

disabling the orientation function: after the orientation function is realized, treading the oriented reset pedal to make the oriented reset pedal rotate with the second pivot member serving as a pivot, then pushing the oriented reset pedal and the multifunctional pedal to make the oriented reset pedal and the multifunctional pedal reset, and then making the first clamping portion of the first warping plate separated from the first recess portion;

disabling the braking function: after the braking function is realized, treading the brake releasing reset pedal to make the brake releasing reset pedal rotate with the second pivot member serving as a pivot, then pushing the brake releasing reset pedal and the auxiliary braking member to make the brake releasing reset pedal and the auxiliary braking member reset, making the second clamping portion of the second warping plate separated from the second recess portion, at the same time, making the third clamping portions of the second warping plate separated from the tooth grooves of the limiting gears, at this moment, only releasing braking by this operation, and still keeping the orientation function for the caster; and realizing a unified reset function: after the braking function is realized, treading the oriented reset pedal and the brake releasing reset pedal at the same time to make the oriented reset pedal and the brake releasing reset pedal rotate with the second pivot member serving as a pivot, then pushing the oriented reset pedal, the multifunctional pedal, the brake releasing reset pedal and the auxiliary braking member to make the oriented reset pedal, the multifunctional pedal reset, the brake releasing reset pedal and the auxiliary braking member reset, then making the first clamping portion of the first warping plate separated from the first recess portion, and at the same time, making the second clamping portion of the second warping plate separated from the second recess portion, and also making the third clamping portions of the second warping plate separated from the tooth grooves of the limiting gears.

It can be seen from the above that in the present invention, the multifunctional pedal is treaded to push the first warping plate to make the first warping plate clamped into the first recess portion of the first inner tooth member, so that the caster can run in an orientated manner; the multifunctional pedal is treaded again to push the auxiliary braking member, and then the second warping plate is pushed to make the second clamping portion of the second warping plate clamped into the second recess portion of the second inner tooth member and to make the third clamping portions of the second warping plate clamped into the limiting gears of the pair of wheel members, so that the caster can be orientated and braked; then the reset pedals are treaded to release the orientation or braking state, the full free state of the caster is realized, and thus the caster can perform the steering, orientation and braking functions.

The multi-pedal-controlled caster in the present invention is reasonable in design, low in process requirement, direct and effective in function and easy to identify and use; and the selection of different functions can be achieved by treading the unified multifunctional pedal, after the selection, releasing can be achieved by treading the reset pedals so as to return to an original universal travel state, and there is no need to worry about mixed treading of the reset pedals due to the fact that only the reset releasing function is completed.

DETAILED DESCRIPTION OF THE EMBODIMENTS

Figure 1:
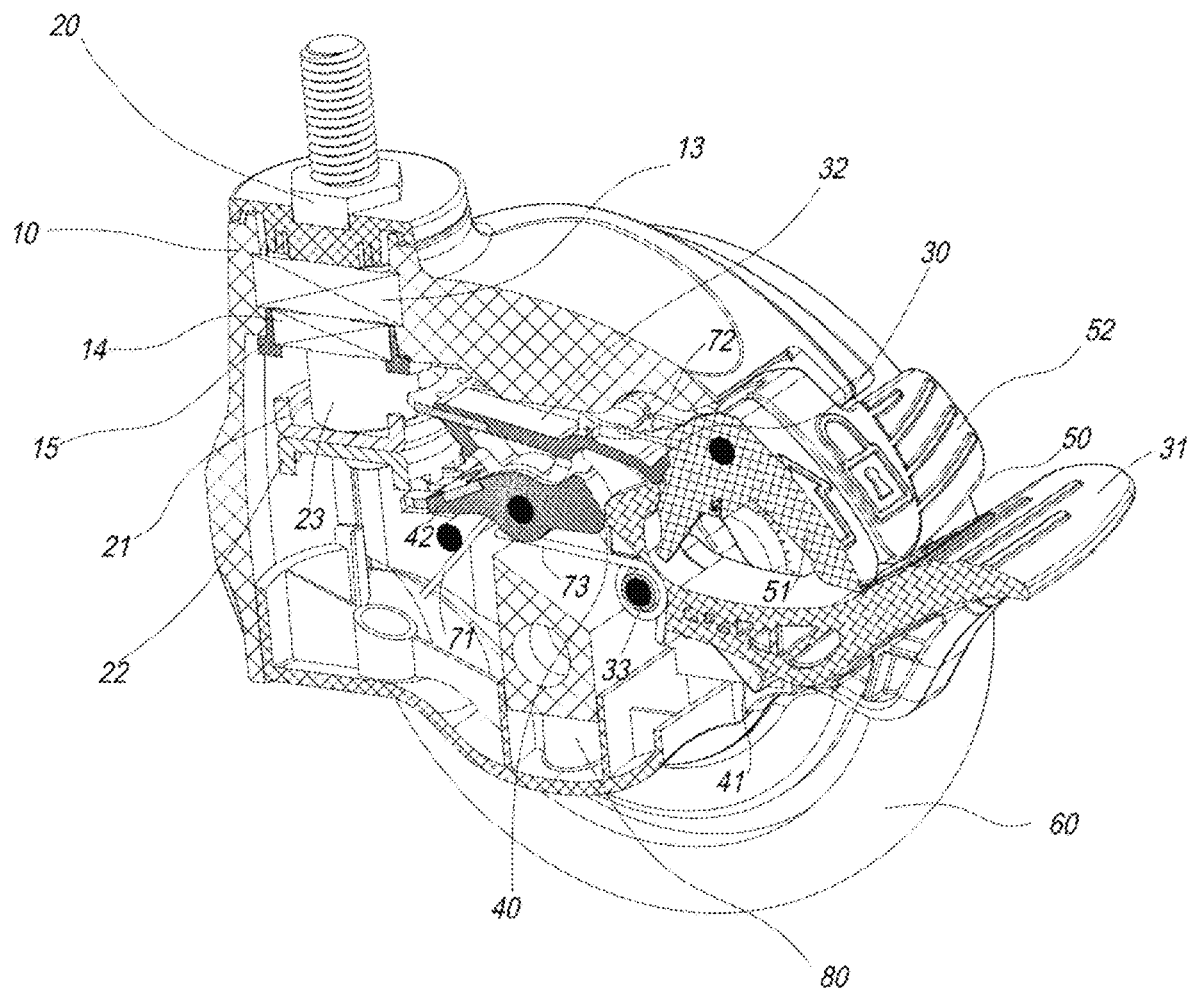
FIG. 1 is a three-dimensional structure diagram of a profile of a caster of the present invention.
Figure 2:
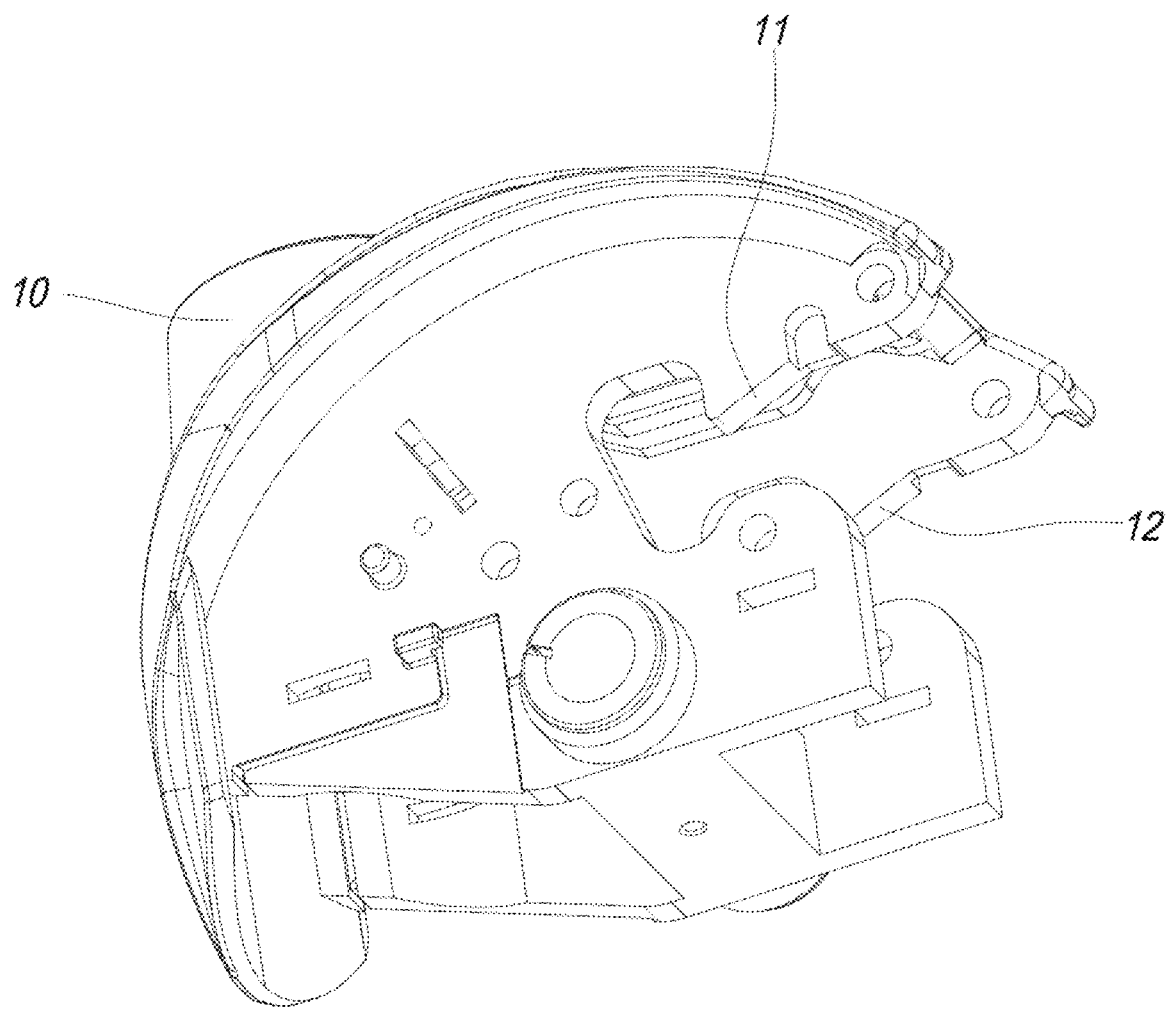
FIG. 2 is a three-dimensional structure diagram of a main body support of the present invention.
Figure 3:
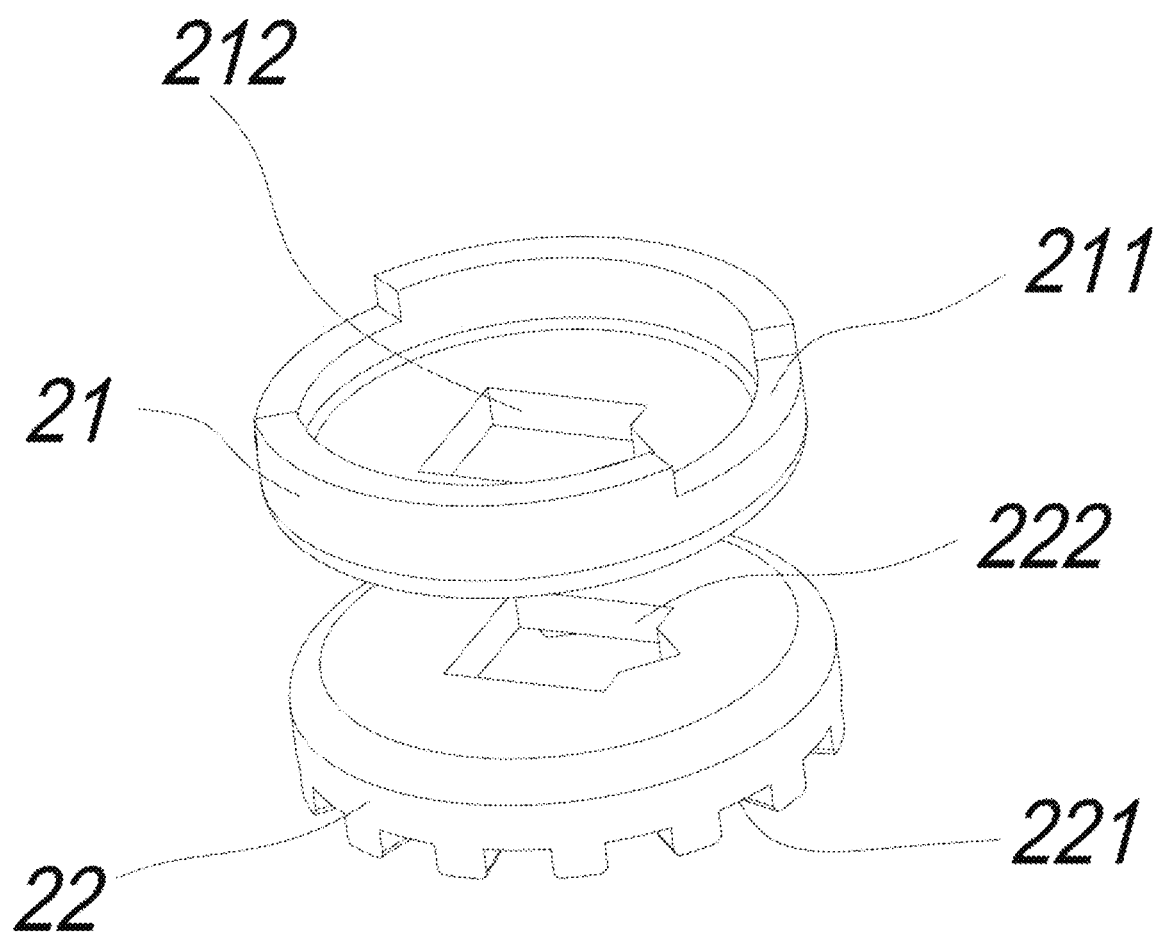
FIG. 3 is a three-dimensional structure diagram of first and second inner tooth members of the present invention.
Figure 4:
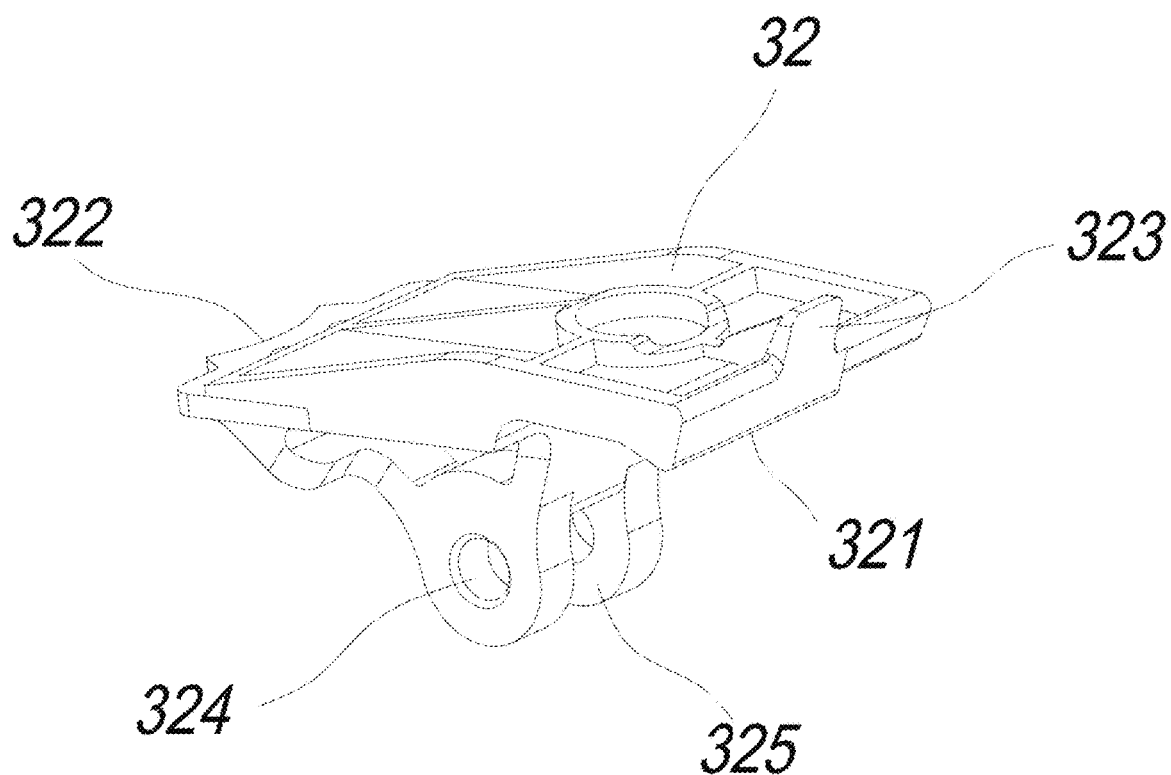
FIGS. 4 and 5 are three-dimensional structure diagrams of a first warping plate and a second warping plate of the present invention.
Figure 5:
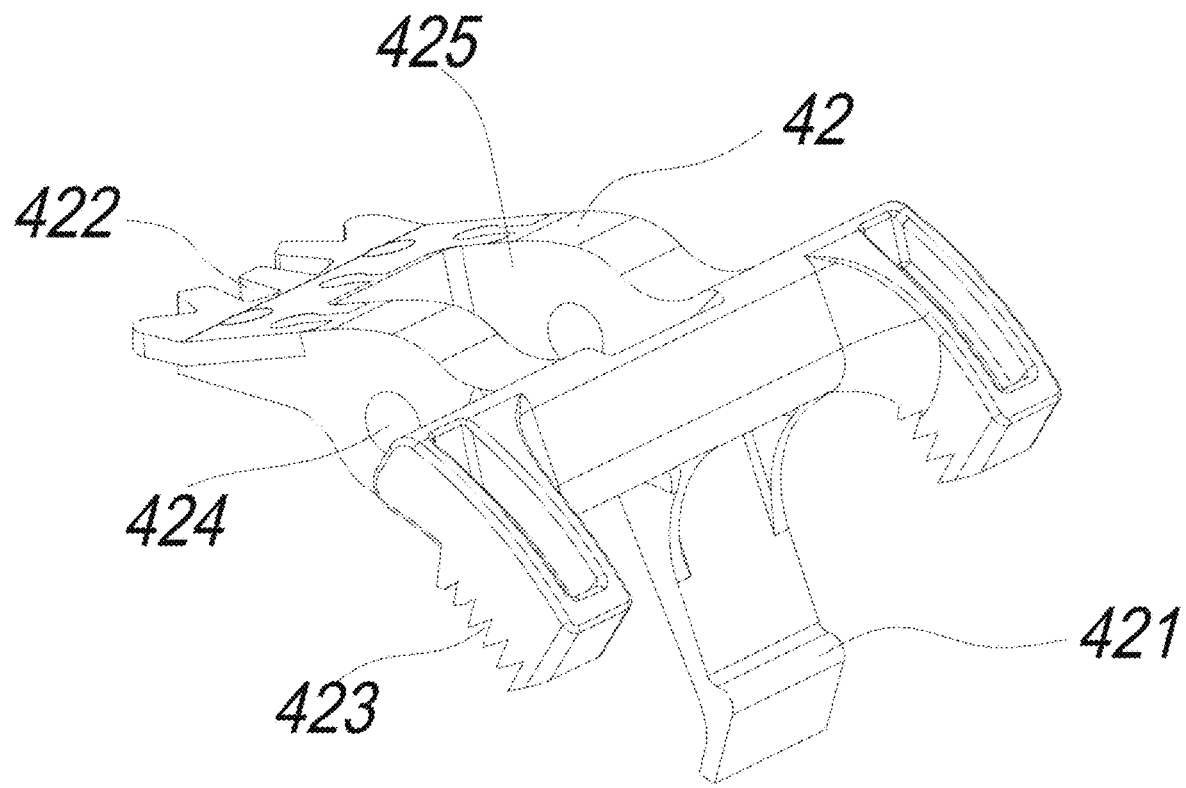
Figure 6:
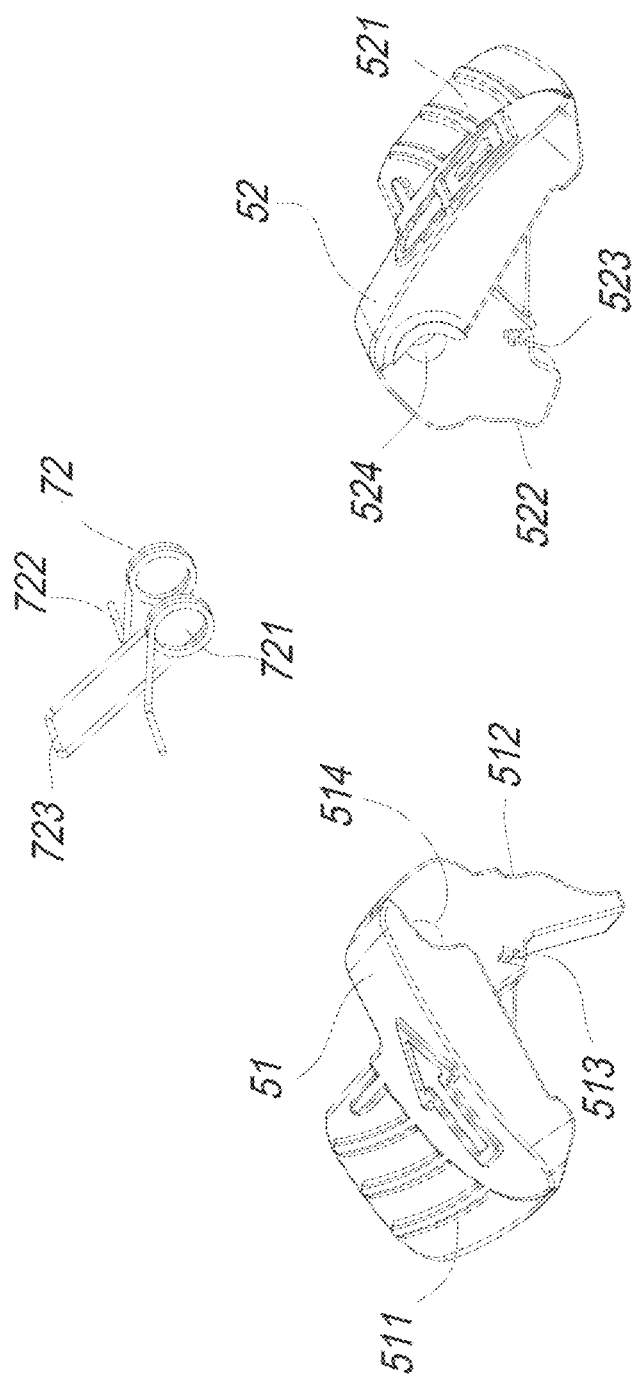
FIG. 6 is a three-dimensional structure diagram of an oriented reset pedal, a brake releasing reset pedal and a second elastic member of the present invention in an explosion state.
Figure 7:
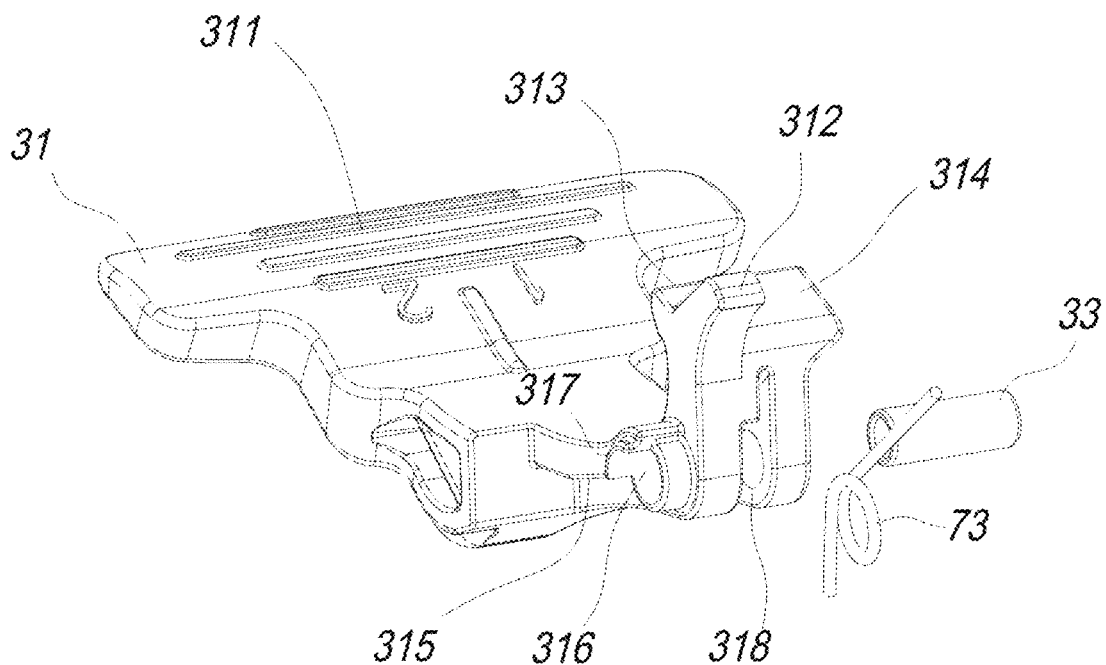
FIG. 7 is a three-dimensional structure diagram of a multifunctional reset pedal, a steel sleeve and a third elastic member of the present invention.
Figure 8:
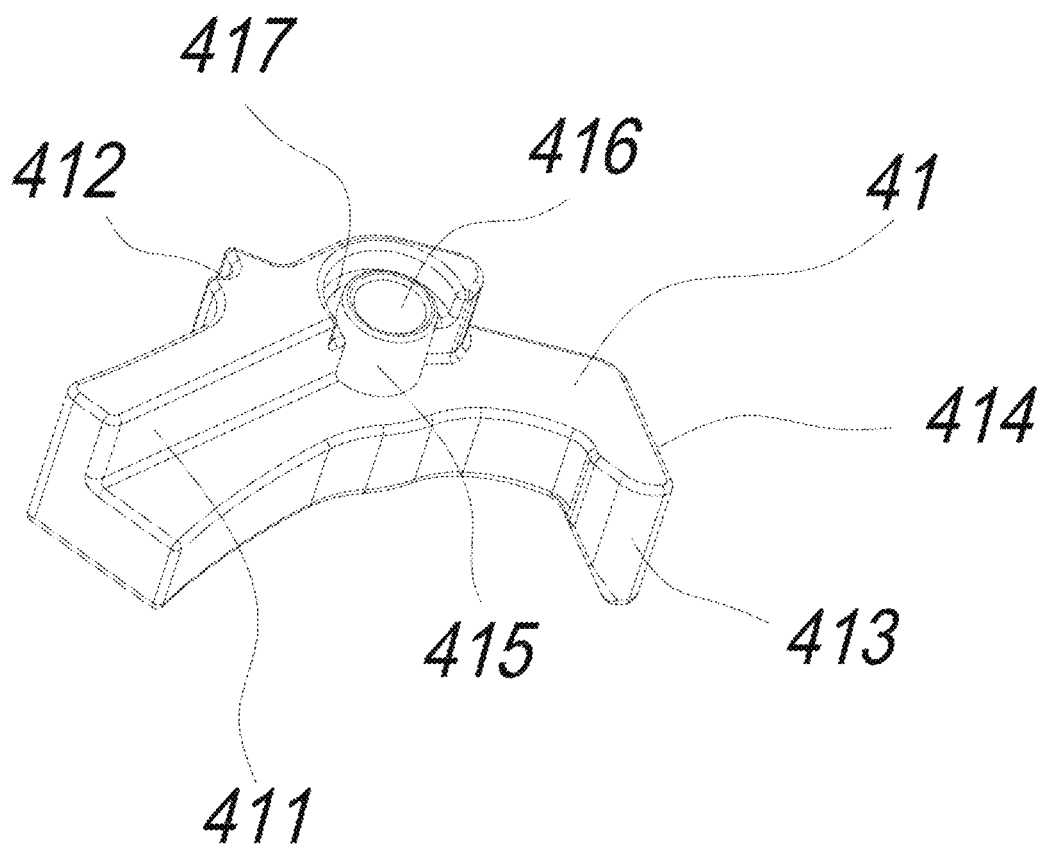
FIG. 8 is a three-dimensional structure diagram of an auxiliary braking member.
Figure 9:
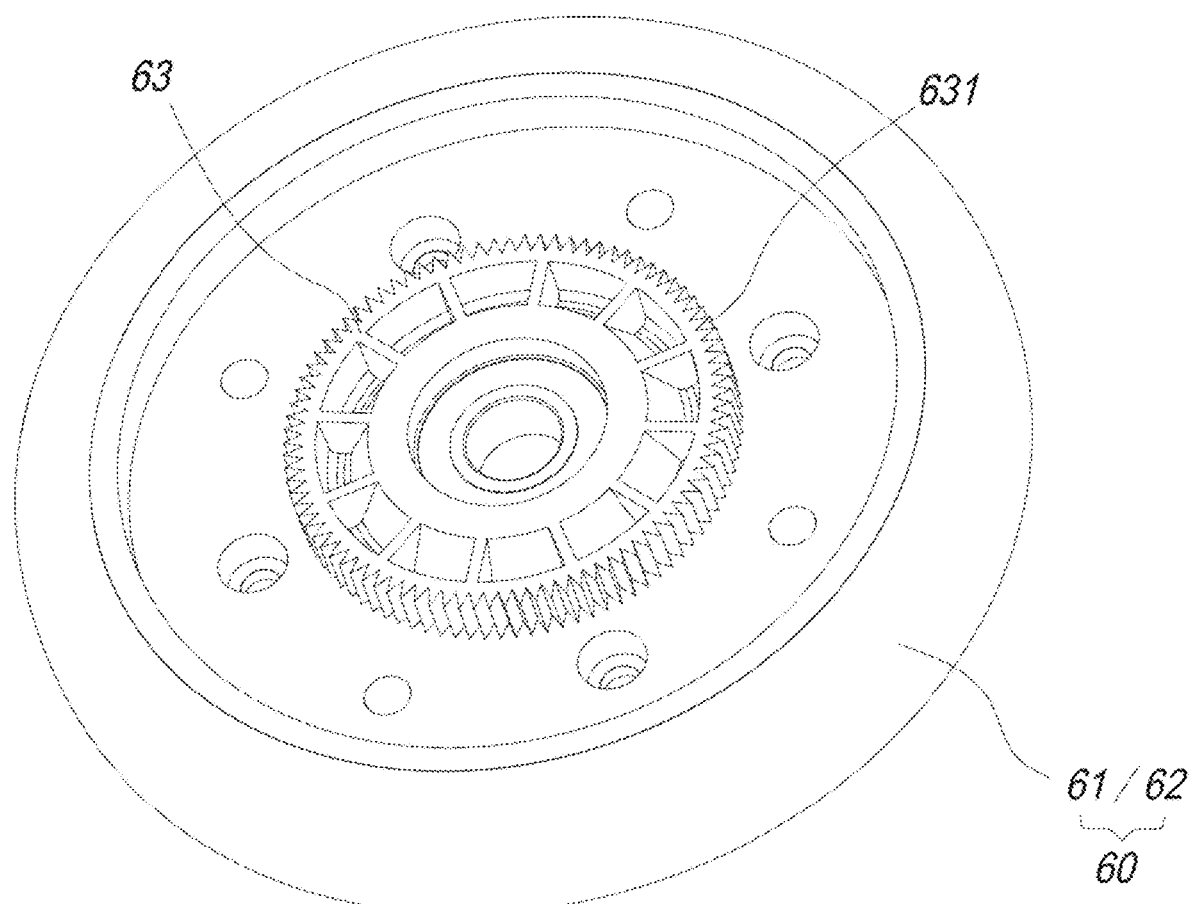
FIG. 9 is a structure diagram of a wheel member of the present invention.

A caster of the present invention is of a structure as shown in FIG. 1 to FIG. 7, including:

a main body support 10, a connecting rod 20, an orientation mechanism 30, a braking mechanism 40, a reset mechanism 50, a pair of wheel members 60 and three elastic members 70, where the main body support 10 has two positioning surfaces 11 and 12, the main body support 10 is relatively rotatably connected and combined with the connecting rod 20, one end of the connecting rod 20 extends into the main body support 10, the end of the connecting rod 20 that extends into the main body support 10 is fixedly sleeved with a first inner tooth member 21 and a second inner tooth member 22, a first recess portion 211 is formed in the first inner tooth member 21, a second recess portion 221 is formed in the second inner tooth member 22, and the upper end of the connecting rod 20 may be connected to the lower portion of a cart and a wheelchair.

The first inner tooth member 21 and the second inner tooth member 22 may be in the shape of a round cover, the first inner tooth member 21 and the second inner tooth member 22 are arranged away from each other, rectangular penetrating holes are formed in the centers of the first inner tooth member 21 and the second inner tooth member 22, the rectangular penetrating holes are sleeved on the connecting rod to realizing fixing of the first inner tooth member 21 and the second inner tooth member 22 relative to the connecting rod in a circumferential direction, the first inner tooth member 21 may be provided with two first recess portions 211 in the circumferential direction, and the second inner tooth member 22 may be provided with a plurality of second recess portions 221 in the circumferential direction, so as to form a serrated shape.

The orientation mechanism 30 includes a multifunctional pedal 31 and a first warping plate 32, one end of the multifunctional pedal 31 has a treading portion 311, a first pushing portion 312 and a first abutting portion 313 are formed at the other end of the multifunctional pedal 31, a third pivot member 35 is further included, and the multifunctional pedal 31 is pivoted to the main body support 10 by means of the third pivot member 35.

The first warping plate 32 is pivoted to the main body support 10 by means of a first pivot member 34, one end of the first warping plate 32 is a first abutted portion 321, a first clamping portion 322 is formed at the other end of the first warping plate 32, the first pushing portion 312 of the multifunctional pedal 31 abuts against the first abutted portion 321, the first clamping portion 322 faces the first recess 211 of the first inner tooth member 21, when the first warping plate 32 swings, the first clamping portion 322 is clamped into or separated from the first recess portion 211, and preferably, a second elastic member 72 is arranged on the first pivot member 34 of the first warping plate 32 such that a force can be applied to the first warping plate 32 by means of the elasticity of the second elastic member 72 when the first warping plate 32 resets.

The braking mechanism 40 includes the multifunctional pedal 31, an auxiliary braking member 41 and a second warping plate 42, one end of the auxiliary braking member 41 has a third abutted portion 411, and the third abutted portion 411 abuts against a third abutting portion 315 of the multifunctional pedal 31; a second abutting portion 413 is formed on one side of the other end of the auxiliary braking member 41, the auxiliary braking member 41 has a second pushing portion 412 located and formed on the other side of the second abutting portion 413, and the auxiliary braking member 41 and the multifunctional pedal 31 are coaxial and are pivoted to the main body support 10 by means of the third pivot member 35.

The second warping plate 42 is also pivoted to the main body support 10 by means of the first pivot member 34, a second abutted portion 421 is formed at one end of the second warping plate 42, the second pushing portion 412 of the auxiliary braking member 41 abuts against the second abutted portion 421, a second clamping portion 422 is formed at the other end of the second warping plate 42, the second clamping portion 422 faces the second recess 221 of the second inner tooth member 22, when the second warping plate 42 swings, the second clamping portion 422 is clamped into or separated from the second recess portion 221, and each of two sides of the second warping plate 42 extends to form a third clamping portion 423.

The reset mechanism 50 includes an oriented reset pedal 51 and a brake releasing reset pedal 52 which are arranged side by side, the two reset pedals of the reset mechanism 50 are coaxial and are pivoted to the main body support 10 by means of a second pivot member 53, a reset treading portion 511 and 521 is respectively arranged at one end of each of the two reset pedals, a fourth abutting portion 512 is formed at the other end of the oriented reset pedal 51, a fifth abutting portion 522 is formed at the other end of the brake releasing reset pedal 52, the fourth abutting portion 512 and the fifth abutting portion 522 face and push the first abutting portion 313 and the second abutting portion 413 until a limiting portion 314 of the multifunctional pedal 31 and a limiting portion 414 of the auxiliary braking member 41 abut against the positioning surfaces 11 and 12 of the main body support 10, and penetrating grooves 513 and penetrating grooves 523 are formed on two sides of the oriented reset pedal 51 and the brake releasing reset pedal 52 respectively.

The second elastic member 72 is further includes, one end of the second elastic member 72 has a sleeving portion 721, each of two sides of the sleeving portion 721 extends to form a penetrating portion 722, the other end of the second elastic member 72 is a limiting portion 723, the sleeving portion 721 of the second elastic member 72 is sleeved on the second pivot member 53, the penetrating portions 722 respectively penetrate into the penetrating grooves 513 and the penetrating grooves 523 on the two sides of the oriented reset pedal 51 and the brake releasing reset pedal 52, the limiting portion 723 abuts above the first abutted portion 321 of the first warping plate 32 in a normal state, and an abutting force of the limiting portion 723 make each of the oriented reset pedal 51, the brake releasing reset pedal 52 and the first warping plate 32 obtain a support force so as to keep the three balanced and not loosened.

The pair of wheel members 60 is pivoted to two sides of the main body support 10, the pair of wheel members 60 includes a first side wheel 61 and a second side wheel 62, a limiting gear 63 is formed on each of the sides of the first side wheel 61 and the second side wheel 62 that face each other, the limiting gear 63 has a plurality of tooth grooves 631, the third clamping portions 423 of the second warping plate 42 face the plurality of tooth grooves 631, and when the second warping plate 42 swings to different positions, the third clamping portions 423 are buckled into the tooth grooves 631, or the third clamping portions 423 are separated from the tooth grooves 631.

Preferably, a first elastic member 71 is further included, the first elastic member 71 is fixed to the first pivot member 34 in a sleeving manner, one end of the first elastic member 71 fixedly abuts against the second warping plate 42, and the other end abuts against the fourth pivot member 54, so that the second warping plate 42 can move and reset more smoothly by means of the elasticity of the first elastic member 71 during movement.

The pivot members may be articulated shafts, and the elastic members may be torsional springs.

Preferably, a bottom decorative cover 80 is further included, the bottom decorative cover 80 is locked to the main body support 10, and the bottom decorative cover 80 is configured to prevent foreign matter from entering the main body support 10.

The third elastic member 73 is sleeved on a steel sleeve 33, the third pivot member 35 penetrates through the steel sleeve 33, and a round hole 316 allowing the steel sleeve 33 to penetrate through is formed in the multifunctional pedal; a penetrating hole 416 is formed in one side of the second pushing portion of the auxiliary braking member, the penetrating hole is configured to be sleeved on the third pivot member 35, an annular groove 417 is formed in one side of the penetrating hole, and the annular groove 417 facilitates sleeving of the penetrating hole on the multifunctional pedal, thereby ensuring that the auxiliary braking member and the multifunctional pedal rotate around the same pivot member; the auxiliary braking member has an L-shaped main section; the connecting rod 20 is sleeved with a bearing 14 rotatably connected to the main body support 10, and the bearing is limited and sealed by means of a sealing ring 15; two connecting plates 325 arranged at an interval are arranged at the lower portion of the first warping plate, through holes 324 are formed in the connecting plates, channels 425 allowing the two connecting plates 325 to penetrate into are formed in the second warping plate, hole channels 424 are formed in walls on two sides of the channels 425, and the first pivot member 34 penetrates through the through holes 324 and the hole channels 424; and penetrating holes 514, 524 allowing the second pivot member 53 to penetrate through are formed in the oriented reset pedal 51 and the brake releasing reset pedal 52 respectively.

Figure 10:
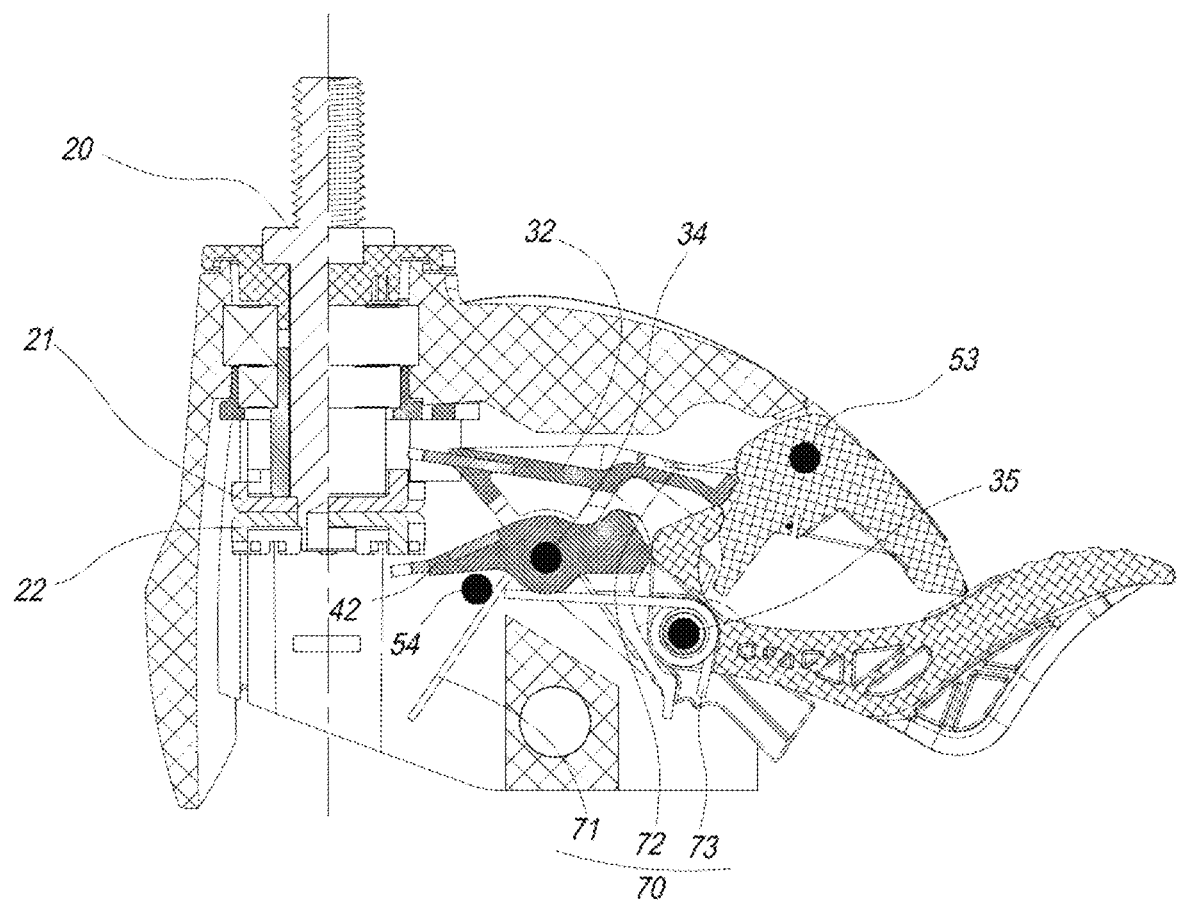
FIG. 10 is a full free state diagram of the present invention.

The structure of the caster of the present invention is as shown in FIG. 10 to FIG. 14 during movement; as shown in FIG. 10, when a user wants to orient the caster such that the caster will not rotate at will, the user treads on the treading portion 311 of the multifunctional pedal 31 firstly to make the multifunctional pedal 31 rotate in a treading direction with the third pivot member 35 serving as a pivot, the first pushing portion 312 and the first abutting portion 313 of the multifunctional pedal 31 also rotate in the same direction, and the first pushing portion 312 abuts against the first abutted portion 321 of the first warping plate 32 in a normal state, so that the first pushing portion 312 pushes the first abutted portion 321 while rotation to make the first warping plate 32 rotate with the first pivot member 34 serving as a pivot, and the first clamping portion 322 of the first warping plate 32 also synchronously rotates and is clamped into the first recess portion 211 of the first inner tooth member 21; the first clamping portion 322 of the first warping plate 32 is clamped in the first recess portion 211, and the first warping plate 32 is pivoted to the main body support 10 by means of the first pivot member 34, so that when the first clamping portion 322 of the first warping plate 32 is clamped in the first recess portion 211, the main body support 10 cannot rotate relative to the connecting rod 20, and thereby achieving the orientation purpose.

Figure 11:
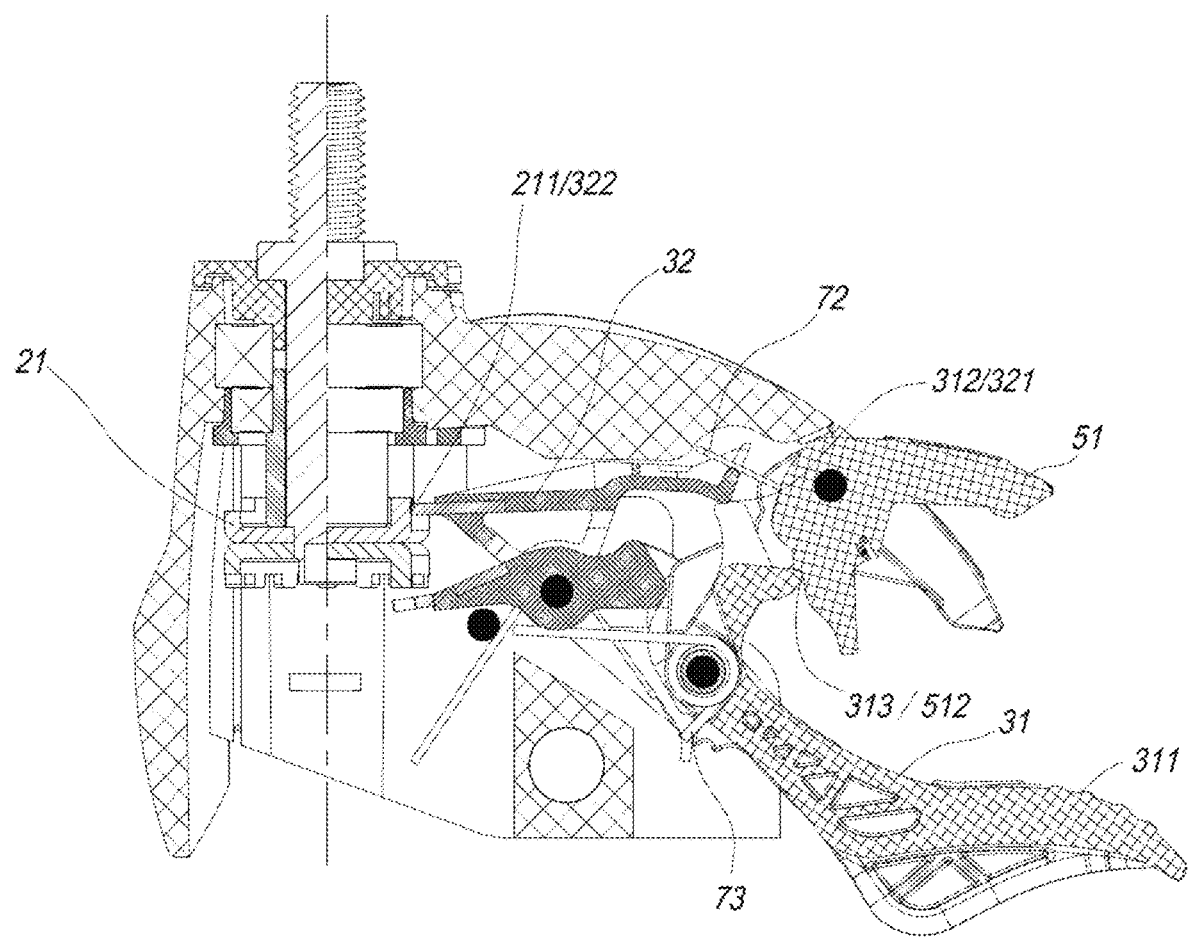
FIG. 11 is an oriented function state diagram of the present invention.

Meanwhile, the first abutting portion 313 rotates to abut against the fourth abutting portion 512 of the oriented reset pedal 51 to make the oriented reset pedal 51 rotate in a pushing direction with the second pivot member 53 serving as a pivot and to make the oriented reset pedal 51 in a treading state, as shown in FIG. 11.

Figure 12:
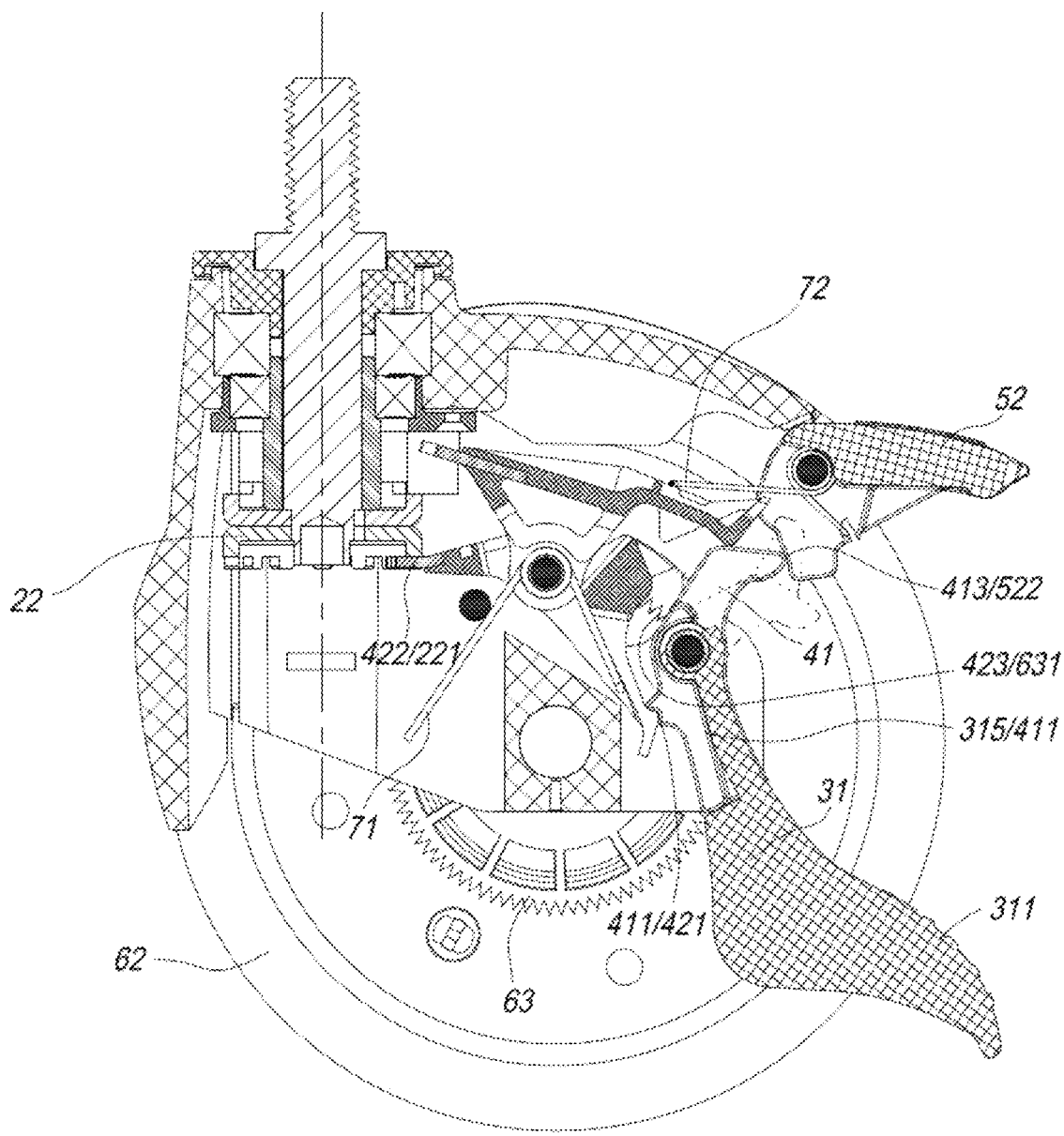
FIG. 12 is a braking function state diagram of the present invention.

As shown in FIG. 12, when the user wants to orient and brake the pair of wheel members 60 at the same time, as shown in FIG. 11, the user continuously treads on the treading portion 311 of the multifunctional pedal 31 firstly to make the multifunctional pedal 31 rotate continuously in a treading direction with the third pivot member 35 serving as a pivot until the third abutting portion 315 of the multifunctional pedal 31 abuts against the third abutted portion 411 of the auxiliary braking member 41, the second pushing portion 412 and the second abutting portion 413 of the auxiliary braking member 41 also rotate in the same direction, and the second pushing portion 412 abuts against the second abutted portion 421 of the second warping plate 42, so that the second pushing portion 412 pushes the second abutted portion 421 while rotation to make the second warping plate 42 rotate with the first pivot member 34 serving as the pivot, the second clamping portion 422 of the second warping plate 42 also synchronously rotates and is clamped into the second recess portion 221 of the second inner tooth member 22, and the third clamping portions 423 of the second warping plate 42 also synchronously rotates and are clamped into clamping grooves 631 of the limiting gears 63 of the pair of wheel members 60.

Meanwhile, the second abutting portion 413 rotates to abut against the third abutting portion 522 of the brake releasing reset pedal 52 to make the brake releasing reset pedal 52 rotate in a pushing direction with the second pivot member 53 serving as the pivot and to make the brake releasing reset pedal 52 in a treading state (as shown in FIG. 12).

Figure 13:
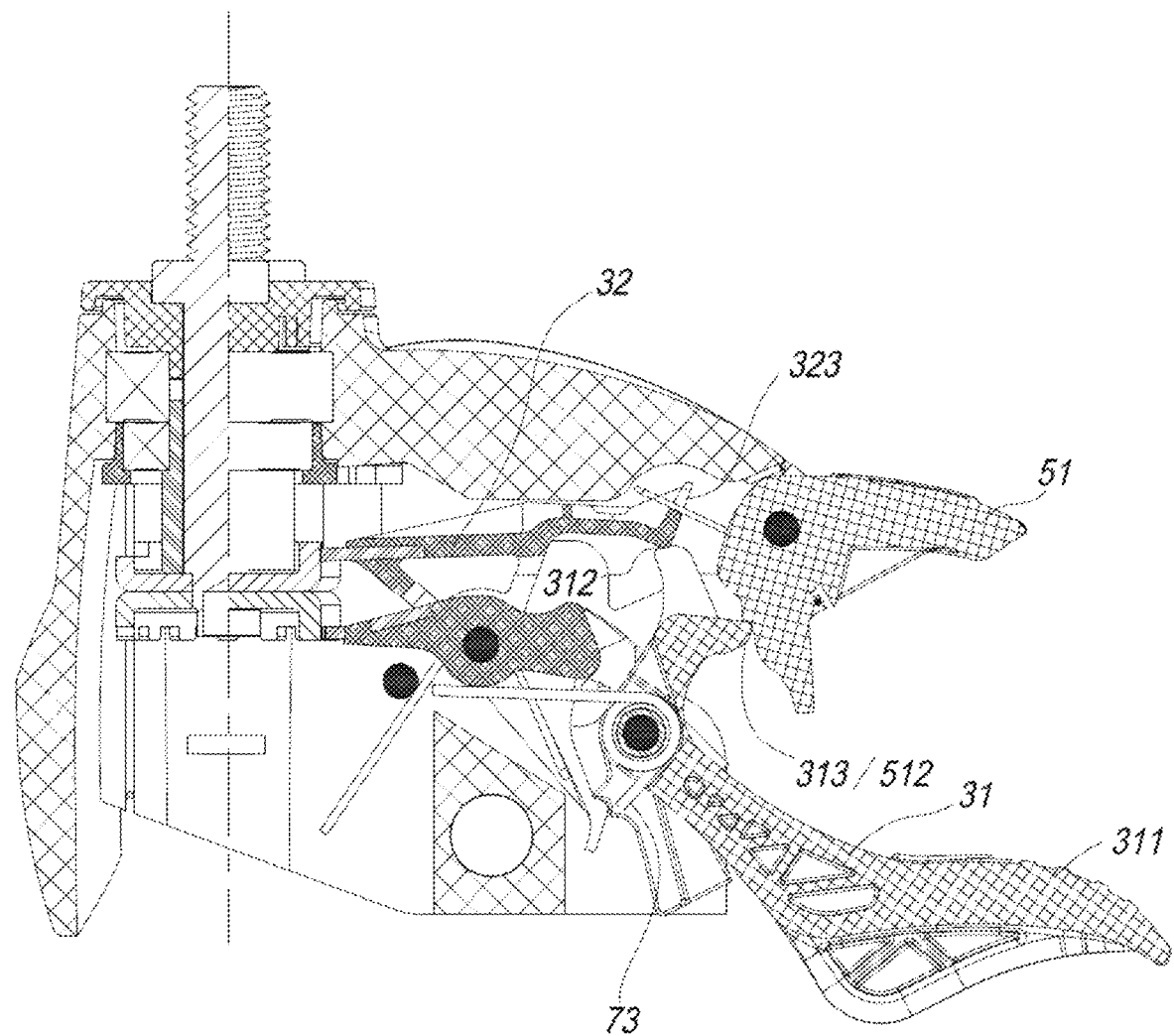
FIG. 13 is a return state diagram of a multifunctional pedal of the present invention after braking.

The third elastic member 73 is further included; one end of the third elastic member 73 has a sleeving portion 731, two sides of the sleeving portion 731 extend to form two limiting portions 732 and 733 respectively, the limiting portion 732 abuts below the second warping plate 42, and the limiting portion 733 abuts in a clamping groove 318 of the multifunctional pedal 31; the treading portion 311 of the multifunctional pedal 31 is loosened, under the action of the elasticity of the third elastic member 73, the multifunctional pedal 31 rotates in a direction opposite to the treading direction with the third pivot member 35 serving as a pivot, and the first pushing portion 312 of the multifunctional pedal 31 abuts against the second abutted portion 323 of the first warping plate 32, so that the first pushing portion 312 pushes the second abutted portion 323 while rotation to make the first warping plate 32 rotate with the first pivot member 34 serving as a pivot until the first pushing portion 312 abuts against the first abutted portion 321 of the first warping plate 32 again; and at this moment, as shown in FIG. 13, the first abutting portion 313 of the multifunctional pedal 31 rotates to return to abut against the fourth abutting portion 512 of the oriented reset pedal 51 to make the oriented reset pedal 51 rotate in a pushing direction with the second pivot member 53 serving as a pivot and to make the oriented reset pedal 51 also in a treading state.

The second clamping portion 422 of the second warping plate 42 is clamped in the second recess portion 221, and the second warping plate 42 is pivoted to the main body support 10 by means of the first pivot member 34, so that when the second clamping portion 422 of the second warping plate 42 is clamped in the second recess portion 221, the main body support 10 cannot rotate relative to the connecting rod 20.

The third clamping portions 423 of the second warping plate 42 also synchronously rotate and are clamped into the clamping grooves 631 of the limiting gears 63 of the pair of wheel members 60, so that the limiting gears 63 of the pair of wheel members are clamped by the third clamping portions 423, then the pair of wheel members 60 cannot rotate, and thereby achieving the orientation and braking purposes at the same time.

Figure 14:
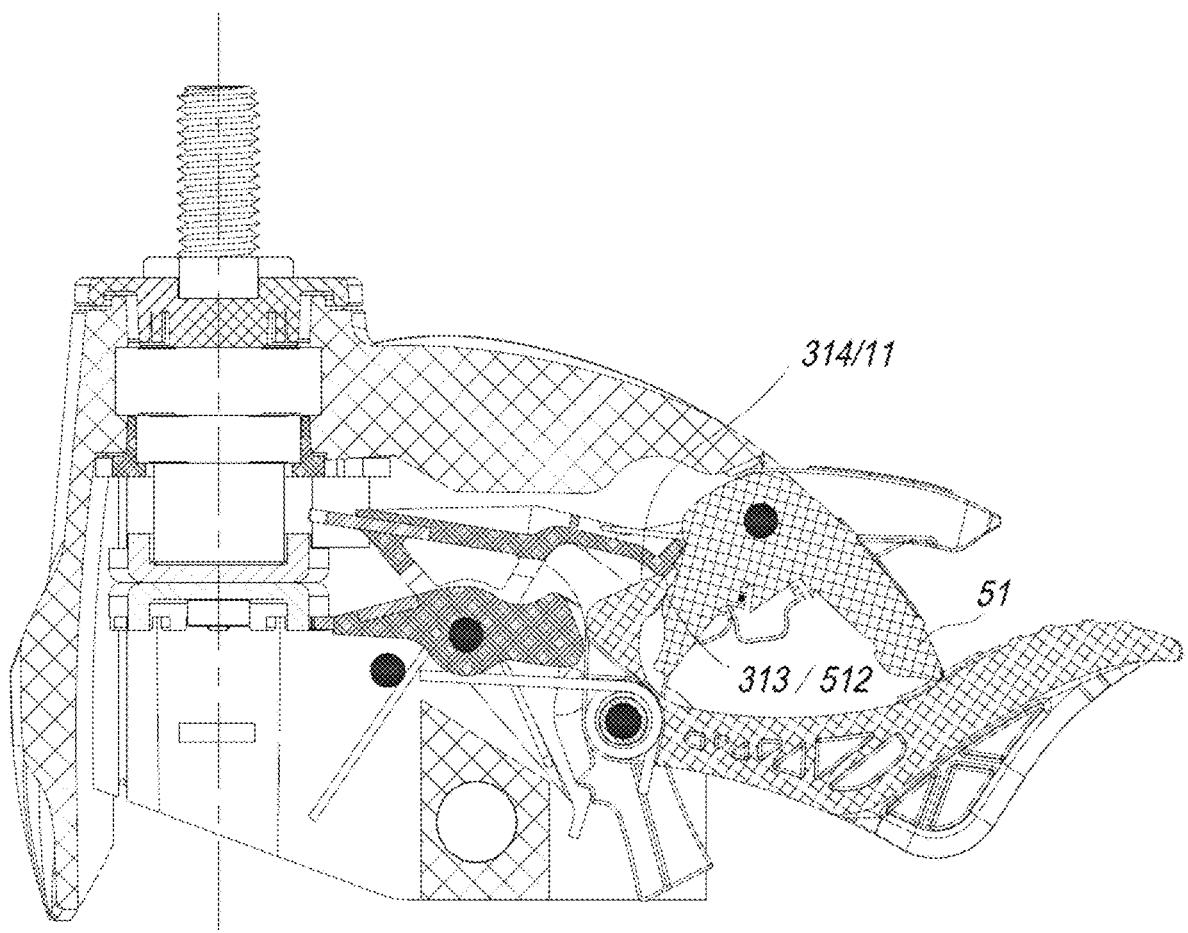
FIG. 14 is a state diagram of the single orientation function reset of the present invention.
Figure 15:
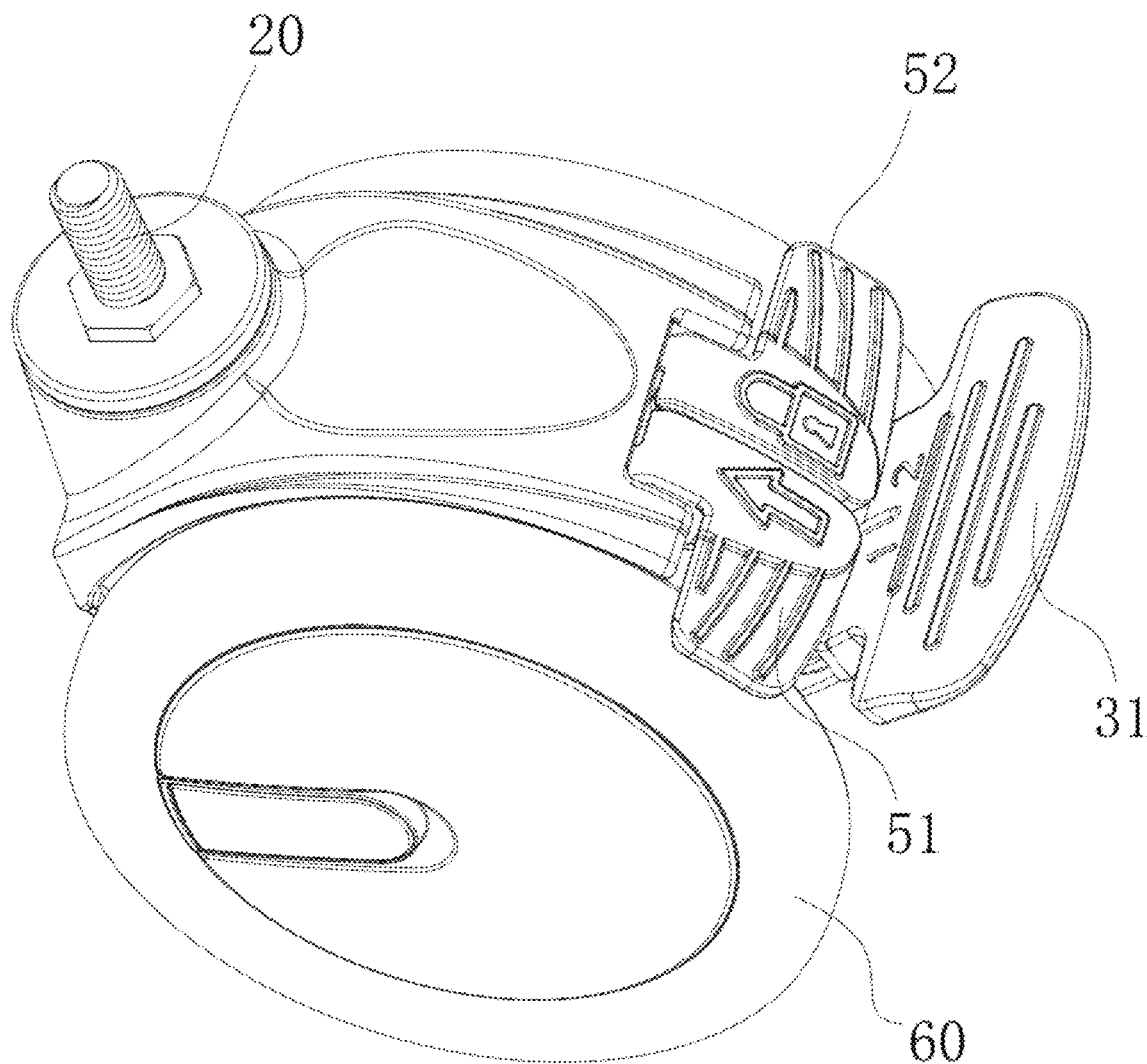
FIG. 15 is a stereogram of a contour of the present invention.
Figure 16:
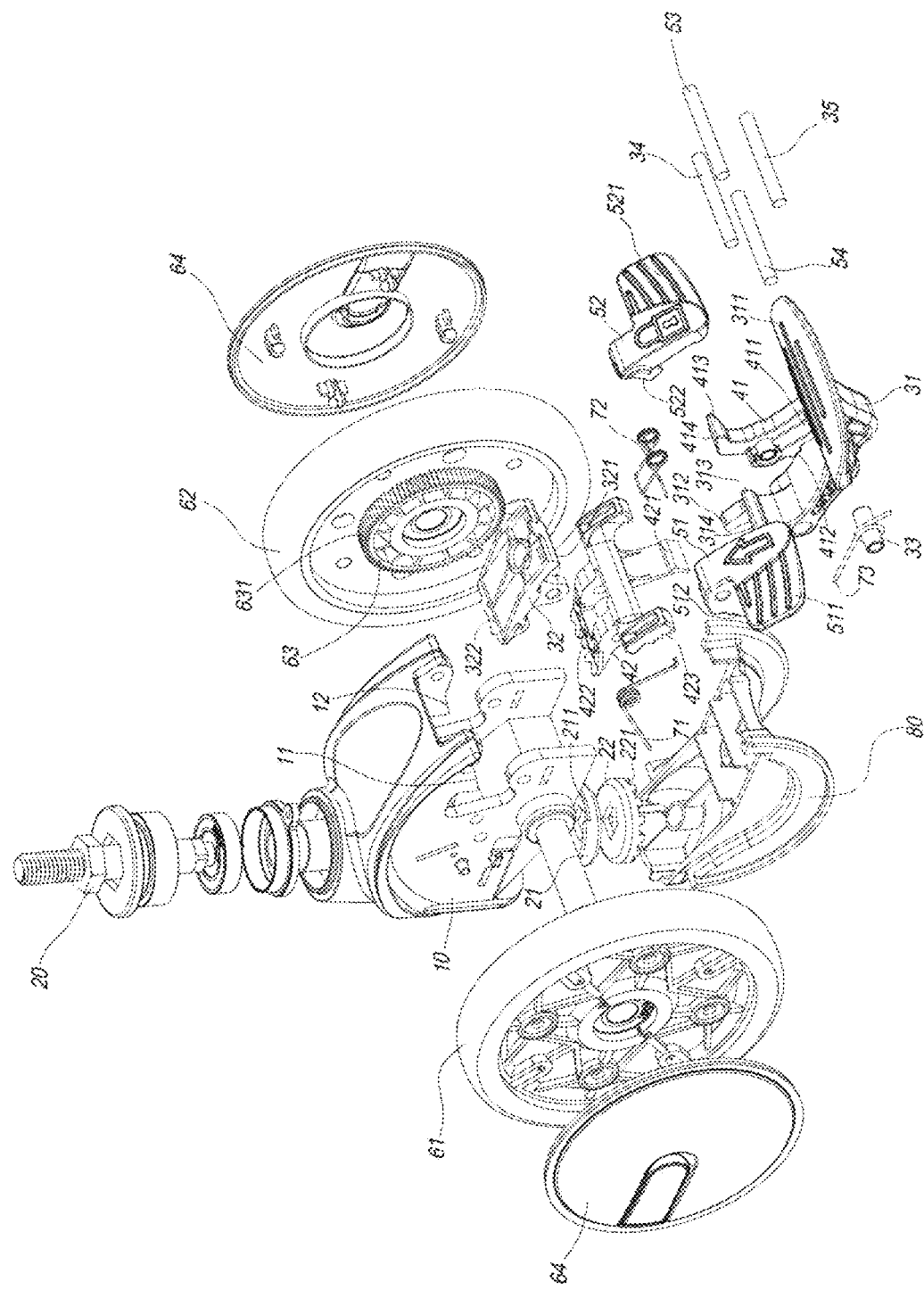
FIG. 16 is an exploded view of the present invention.
Figure 17:
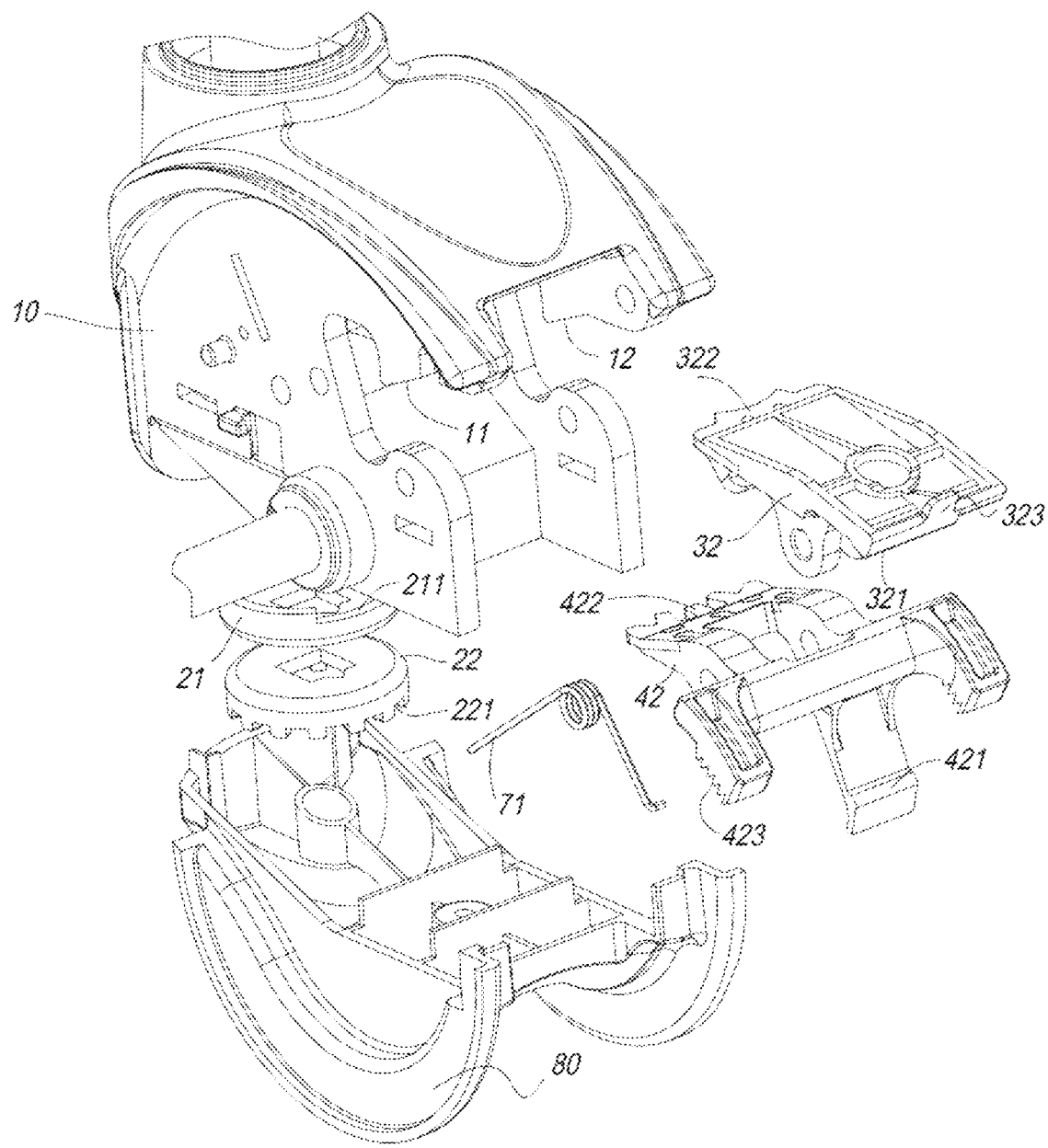
FIGS. 17 and 18 are partial views of FIG. 16.
Figure 18:
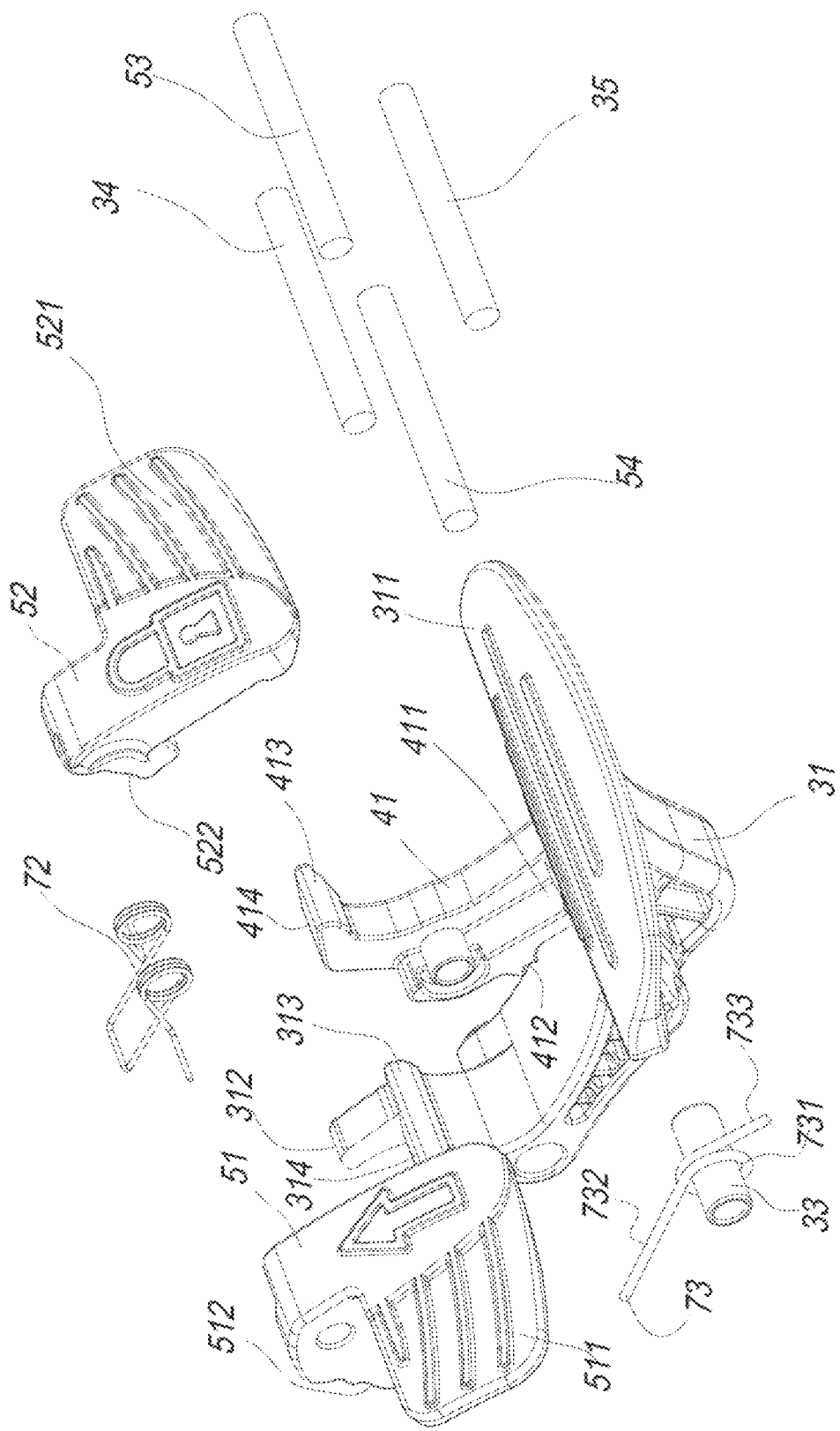
Figure 19:
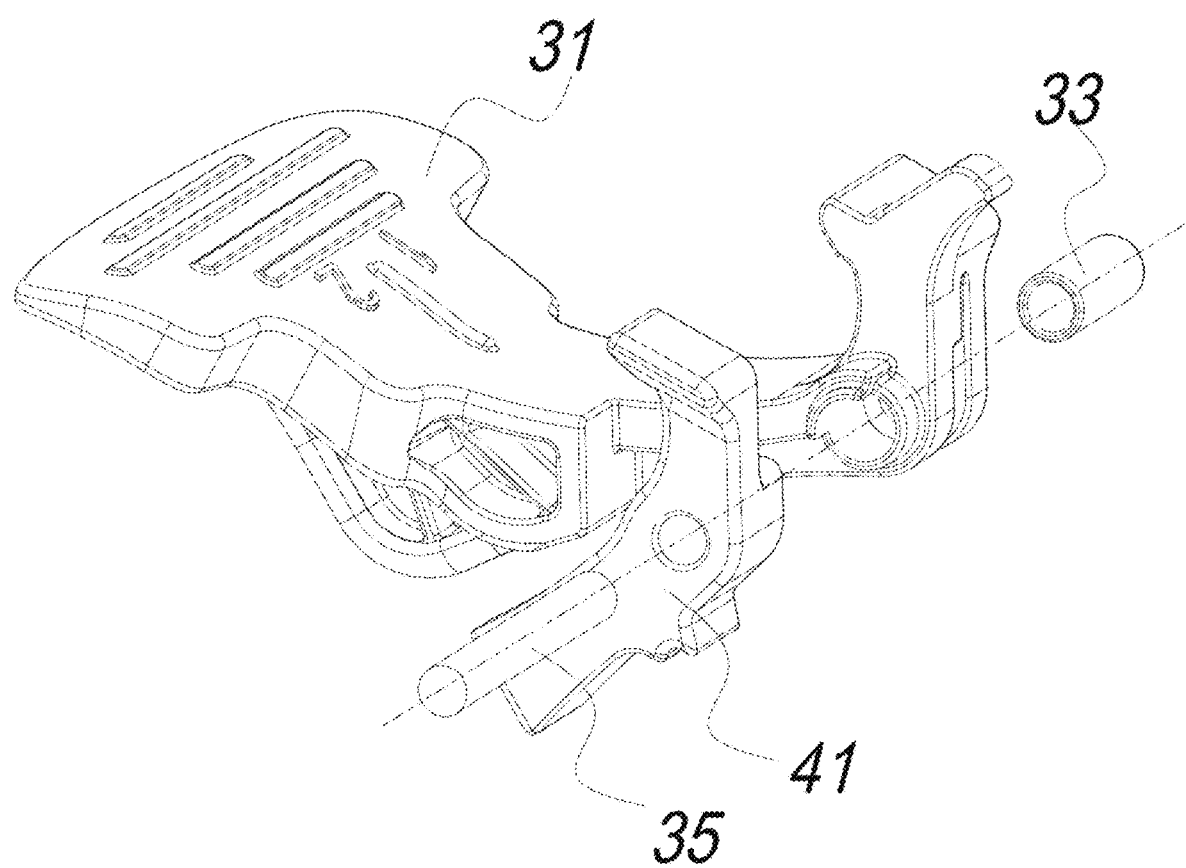
FIG. 19 is a stereogram of the multifunctional reset pedal and the auxiliary braking member in an explosion state.
Figure 20:
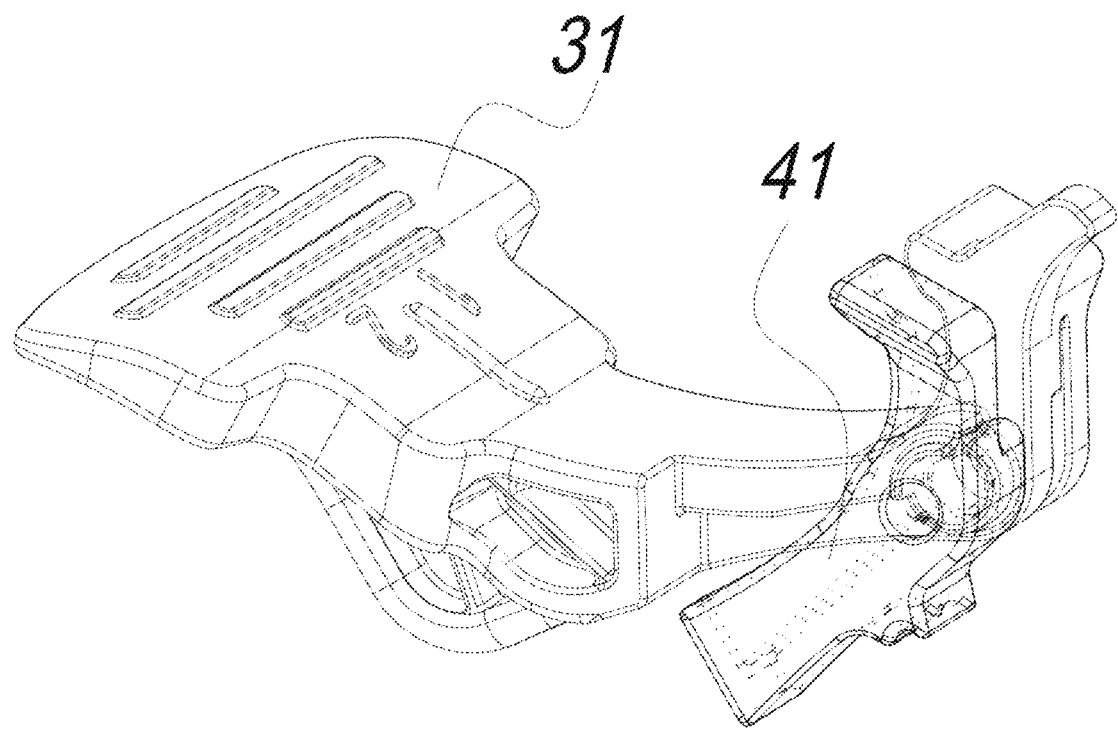
FIG. 20 is a stereogram of the multifunctional reset pedal and the auxiliary braking member (dotted lines) in a combined state.

As shown in FIG. 14 and FIG. 10, when the user wants to release the orientation state, the braking state or the orientation and braking state, the oriented reset pedal 51 and the brake releasing reset pedal 52 are in the treading state at this moment, so that the treading portion 511 of the oriented reset pedal 51 or/and the treading portion 521 of the brake releasing reset pedal 52 is/are treaded firstly to make the oriented reset pedal 51 or/and the brake releasing reset pedal 52 rotate in a treading direction with the third pivot member 35 serving as a pivot, and the fourth abutting portion 512 of the oriented reset pedal 51 or/and the fifth abutting portion 522 the brake releasing reset pedal 52 also rotate in the same direction to push the first pushing portion 312 and the second abutting portion 313 of the multifunctional pedal 31 or/and the second abutting portion 413 of the auxiliary braking member 41 to make the multifunctional pedal 31 or/and the auxiliary braking member 41 rotate in a pushing direction with the third pivot member 35 serving as a pivot.

The first pushing portion 312 rotates synchronously while the multifunctional pedal 31 rotates, so that the first abutted portion 321 of the first warping plate 32 loses the pushing force and then rotates to reset; and the first clamping portion 322 of the first warping plate 32 is separated from the first recess portion 211 of the first inner tooth member 21, the first clamping portion 322 is not clamped by the first recess portion 211, and then the main body support 10 can rotate.

The second pushing portion 412 rotates synchronously while the auxiliary braking member 41 rotates, so that the second abutted portion 421 of the second warping plate 42 loses the pushing force and then rotates to reset; and the second clamping portion 422 of the second warping plate 42 is separated from the second recess 221 of the second inner tooth member 22, the second clamping portion 422 is not clamped by the second recess portion 221, at the same time, the third clamping portions 423 are separated from the tooth grooves 631 of the limiting gears 63, then the main body support 10 can rotate, and the pair of wheel members 60 can rotate.

As shown in FIG. 10 to FIG. 14, the method for using the caster of the present invention includes:

treading the multifunctional pedal 311 of the multifunctional pedal 31 to make the multifunctional pedal 31 rotate with the third pivot member 35 serving as a pivot, then pushing the first warping plate 32 to make the first warping plate 32 rotate synchronously, and then making the first clamping portion 322 of the first warping plate 32 clamped into the first recess portion 211 of the first inner tooth member 21, so that the main body support 10 cannot rotate relative to the connecting rod 20, thereby achieving the orientation purpose;

continuously treading the treading portion 311 of the multifunctional pedal 31 to make the third abutting portion 315 of the multifunctional pedal 31 abut against the third abutted portion 411 of the auxiliary braking member 41, making the auxiliary braking member 41 rotate with the third pivot member 35 serving as a pivot, then pushing the second warping plate 42 to make the second warping plate 42 rotate synchronously, and then making the second clamping portion 422 of the second warping plate 42 clamped into the second recess portion 221 of the second inner tooth member 22 and making the third clamping portions 423 of the second warping plate 42 clamped into the tooth grooves 631 of the limiting gears 63, so that the pair of wheel members 60 cannot rotate, thereby achieving the braking function;

treading the oriented reset pedal 51 or/and treading the brake releasing reset pedal 52 to make the oriented reset pedal 51 or/and the brake releasing reset pedal 52 rotate with the second pivot member 53 serving as a pivot, then pushing the multifunctional pedal 31 or/and the auxiliary braking member 41 to make the multifunctional pedal 31 or/and the auxiliary braking member 41 reset, then making the first clamping portion 322 of the first warping plate 32 separated from the first recess portion 211, or/and making the second clamping portion 422 of the second warping plate 42 separated from the second recess portion 221, and making the third clamping portions 423 of the second warping plate 42 separated from the tooth grooves 631 of the limiting gears 63, thereby returning to the oriented or full free state.

It can be seen from the above that in the present invention, the multifunctional pedal 31 of the orientation mechanism 30 is treaded to push the first warping plate 32 to make the first warping plate 32 clamped into the first recess portion 211 of the first inner tooth member 21, so that the caster can run in an orientated manner; the multifunctional pedal 31 is treaded again to push the auxiliary braking member 41 of the braking mechanism, and then the second warping plate 42 is pushed to make the second clamping portion 422 of the second warping plate 42 clamped into the second recess portion 221 of the second inner tooth member 22 and to make the third clamping portions 423 of the second warping plate 42 clamped into the limiting gears 63 of the pair of wheel members 60, so that the caster can be orientated and braked; then the oriented reset pedal or/and the brake releasing reset pedal is/are treaded to reset to the orientated or full free state, and thus the caster can perform the steering, orientation and braking functions.

What is claimed is:

1. A multi-pedal-controlled caster, comprising:
a main body support, a connecting rod, an orientation mechanism, a braking mechanism, a reset mechanism, a pair of wheel members and three elastic members,
wherein the main body support is relatively rotatably connected and combined with the connecting rod, an end of the connecting rod extends into the main body support, the end, extending into the main body support, of the connecting rod is fixedly sleeved with a first inner tooth member and a second inner tooth member, a first recess portion is formed in the first inner tooth member, and a second recess portion is formed in the second inner tooth member;
the orientation mechanism comprises a multifunctional pedal and a first warping plate, a first end of the multifunctional pedal has a treading portion, and a first pushing portion and a first abutting portion are formed at a second end of the multifunctional pedal;

a first end of the first warping plate is a first abutted portion, a first clamping portion is formed at a second end of the first warping plate, the first pushing portion of the multifunctional pedal abuts against the first abutted portion, the first clamping portion faces the first recess portion of the first inner tooth member, and when the first warping plate swings, the first clamping portion is clamped into or separated from the first recess portion;

the braking mechanism comprises the multifunctional pedal, an auxiliary braking member and a second warping plate, a first end of the auxiliary braking member has a third abutted portion, and the third abutted portion abuts against a third abutting portion of the multifunctional pedal; a second abutting portion is formed on one side of a second end of the auxiliary braking member, the auxiliary braking member has a second pushing portion located and formed on the other side of the second abutting portion, and the auxiliary braking member and the multifunctional pedal are coaxial and are pivoted to the main body support by means of a third pivot member;

a second abutted portion is formed at a first end of the second warping plate, the second pushing portion of the auxiliary braking member abuts against the second abutted portion, a second clamping portion is formed at a second end of the second warping plate, the second clamping portion faces the second recess portion of the second inner tooth member, when the second warping plate swings, the second clamping portion is clamped into or separated from the second recess portion, and each of two sides of the second warping plate extends to form a third clamping portion;

the reset mechanism comprises an oriented reset pedal and a brake releasing reset pedal, wherein the oriented reset pedal and the brake releasing reset pedal are arranged side by side, the oriented reset pedal and the brake releasing reset pedal of the reset mechanism are coaxial and are pivoted to the main body support by means of a second pivot member, a reset treading portion is arranged at a first end of each of the oriented reset pedal and the brake releasing reset pedal, a fourth abutting portion is formed at a second end of the oriented reset pedal, a fifth abutting portion is formed at a second end of the brake releasing reset pedal, and the fourth abutting portion and the fifth abutting portion face and push the first abutting portion and the second abutting portion;

the pair of wheel members comprises a first side wheel and a second side wheel, a limiting gear is formed on each of sides of the first side wheel and the second side wheel, wherein the sides face each other, the limiting gear has a plurality of tooth grooves, the third clamping portions of the second warping plate face the plurality of tooth grooves, and when the second warping plate swings to different positions, the third clamping portions are buckled into the plurality of tooth grooves, or the third clamping portions are separated from the plurality of tooth grooves; and the three elastic members comprises a first elastic member, a second elastic member and a third elastic member, the first elastic member is coaxial with the first warping plate and the second warping plate, and one end of the first elastic member abuts against the second warping plate; the second elastic member is coaxial with the oriented reset pedal and the brake releasing reset pedal, a first end of the second elastic member penetrates through the oriented reset pedal and the brake releasing reset pedal respectively, and a second end of the second elastic member abuts against the first warping plate; and the third elastic member penetrates through the coaxial multifunctional pedal and auxiliary braking member, a first end of the third elastic member abuts against the multifunctional pedal, and a second end of the third elastic member abuts below the second warping plate.

2. The multi-pedal-controlled caster according to claim 1, comprising: a first pivot member, the second pivot member, the third pivot member and a fourth pivot member,
   wherein the first warping plate, the second warping plate and the first elastic member are pivoted to the main body support by means of the first pivot member,
   the multifunctional pedal, the third elastic member penetrating through the multifunctional pedal, and the auxiliary braking member are pivoted to the main body support by means of the third pivot member,
   the oriented reset pedal, the brake releasing reset pedal and the second elastic member are pivoted to the main body support by means of the second pivot member, and
   the fourth pivot member is configured to abut against a second end of the first elastic member and is pivoted to the main body support.

3. The multi-pedal-controlled caster according to claim 2, wherein the first elastic member is fixed to the first pivot member in a sleeving manner, a first end of the first elastic member fixedly abuts against the second warping plate, and a second end of the first elastic member abuts against the fourth pivot member;
   a first end of the second elastic member has a first sleeving portion, each of two sides of the first sleeving portion extends to form a penetrating portion, a second end of the second elastic member is a first limiting portion, the first sleeving portion of the second elastic member is sleeved on the second pivot member, the penetrating portions respectively penetrate into first penetrating grooves and second penetrating grooves on two sides of the oriented reset pedal and the brake releasing reset pedal, the first limiting portion abuts above the first abutted portion of the first warping plate in a normal state, and an abutting force of the first limiting portion make each of the oriented reset pedal, the brake releasing reset pedal and the first warping plate obtain a support force; and
   one end of the third elastic member has a second sleeving portion sleeved on the third pivot member, two sides of the second sleeving portion extend to form second and third limiting portions respectively, the second limiting portion abuts below the second warping plate, and the third limiting portion abuts in a clamping groove of the multifunctional pedal.

4. The multi-pedal-controlled caster according to claim 1, wherein the third elastic member is sleeved on a steel sleeve, the third pivot member penetrates through the steel sleeve, and a round hole allowing the steel sleeve to penetrate through is formed in the multifunctional pedal.

5. The multi-pedal-controlled caster according to claim 1, wherein a penetrating hole is formed in one side of the second pushing portion of the auxiliary braking member, the penetrating hole is configured to be sleeved on the third pivot member, an annular groove is formed in one side of the penetrating hole, and the annular groove facilitates sleeving of the penetrating hole on the multifunctional pedal, thereby ensuring that the auxiliary braking member and the multifunctional pedal rotate around the same pivot member; and the auxiliary braking member has an L-shaped main section.

6. The multi-pedal-controlled caster according to claim 1, wherein the main body support has two positioning surfaces, wherein the two positioning surfaces allow a limiting portion of the multifunctional pedal and a limiting portion of the auxiliary braking member to abut against.

7. The multi-pedal-controlled caster according to claim 1, wherein the first inner tooth member and the second inner tooth member are in a shape of a round cover, the first inner tooth member and the second inner tooth member are arranged away from each other, rectangular penetrating holes are formed in centers of the first inner tooth member and the second inner tooth member, the rectangular penetrating holes are sleeved on the connecting rod to realizing fixing of the first inner tooth member and the second inner tooth member relative to the connecting rod in a circumferential direction, the first inner tooth member is provided with two first recess portions in the circumferential direction, and the second inner tooth member is provided with a plurality of second recess portions in the circumferential direction, to form a serrated shape.

8. The multi-pedal-controlled caster according to claim 1, wherein the multi-pedal-controlled caster further comprises a bottom decorative cover, wherein the bottom decorative cover is locked at a bottom of the main body support.

9. The multi-pedal-controlled caster according to claim 1, wherein the connecting rod is sleeved with a bearing rotatably connected to the main body support, and the bearing is limited and sealed by means of a sealing ring;
two connecting plates arranged at an interval are arranged at a lower portion of the first warping plate, through holes are formed in the two connecting plates, channels allowing the two connecting plates to penetrate into are formed in the second warping plate, hole channels are formed in walls on two sides of the channels, and a first pivot member penetrates through the through holes and the hole channels; and
penetrating holes allowing the second pivot member to penetrate through are formed in the oriented reset pedal and the brake releasing reset pedal respectively.

10. A method for using the multi-pedal-controlled caster according to claim 1, comprising:
realizing an orientation function: treading the multifunctional pedal to make the multifunctional pedal rotate with the third pivot member serving as a pivot, pushing the first warping plate to make the first warping plate rotate synchronously, and making the first clamping portion of the first warping plate clamped into the first recess portion of the first inner tooth member;
realizing a braking function: treading the multifunctional pedal to make the multifunctional pedal rotate with the third pivot member serving as the pivot, pushing the auxiliary braking member to make the auxiliary braking member rotate synchronously with the third pivot member serving as the pivot, further pushing the second warping plate to make the second warping plate rotate synchronously, and making the second clamping portion of the second warping plate clamped into the second recess portion of the second inner tooth member and making the third clamping portions of the second warping plate clamped into the plurality of tooth grooves of the limiting gears;
disabling the orientation function: after the orientation function is realized, treading the oriented reset pedal to make the oriented reset pedal rotate with the second pivot member serving as a pivot, pushing the oriented reset pedal and the multifunctional pedal to make the oriented reset pedal and the multifunctional pedal reset, and making the first clamping portion of the first warping plate separated from the first recess portion;
disabling the braking function: after the braking function is realized, treading the brake releasing reset pedal to make the brake releasing reset pedal rotate with the second pivot member serving as the pivot, pushing the brake releasing reset pedal and the auxiliary braking member to make the brake releasing reset pedal and the auxiliary braking member reset, making the second clamping portion of the second warping plate separated from the second recess portion, at the same time, making the third clamping portions of the second warping plate separated from the plurality of tooth grooves of the limiting gears, at this moment, only releasing braking by this operation, and still keeping the orientation function for the multi-pedal-controlled caster; and
realizing a unified reset function: after the braking function is realized, treading the oriented reset pedal and the brake releasing reset pedal at the same time to make the oriented reset pedal and the brake releasing reset pedal rotate with the second pivot member serving as the pivot, pushing the oriented reset pedal, the multifunctional pedal, the brake releasing reset pedal and the auxiliary braking member to make the oriented reset pedal, the multifunctional pedal reset, the brake releasing reset pedal and the auxiliary braking member reset, making the first clamping portion of the first warping plate separated from the first recess portion, and at the same time, making the second clamping portion of the second warping plate separated from the second recess portion, and further making the third clamping portions of the second warping plate separated from the plurality of tooth grooves of the limiting gears.

11. The multi-pedal-controlled caster according to claim 2, wherein the third elastic member is sleeved on a steel sleeve, the third pivot member penetrates through the steel sleeve, and a round hole allowing the steel sleeve to penetrate through is formed in the multifunctional pedal.

12. The multi-pedal-controlled caster according to claim 3, wherein the third elastic member is sleeved on a steel sleeve, the third pivot member penetrates through the steel sleeve, and a round hole allowing the steel sleeve to penetrate through is formed in the multifunctional pedal.

13. The multi-pedal-controlled caster according to claim 2, wherein a penetrating hole is formed in one side of the second pushing portion of the auxiliary braking member, the penetrating hole is configured to be sleeved on the third pivot member, an annular groove is formed in one side of the penetrating hole, and the annular groove facilitates sleeving of the penetrating hole on the multifunctional pedal, thereby ensuring that the auxiliary braking member and the multifunctional pedal rotate around the same pivot member; and the auxiliary braking member has an L-shaped main section.

14. The multi-pedal-controlled caster according to claim 3, wherein a penetrating hole is formed in one side of the second pushing portion of the auxiliary braking member, the penetrating hole is configured to be sleeved on the third pivot member, an annular groove is formed in one side of the penetrating hole, and the annular groove facilitates sleeving of the penetrating hole on the multifunctional pedal, thereby ensuring that the auxiliary braking member and the multifunctional pedal rotate around the same pivot member; and the auxiliary braking member has an L-shaped main section.

15. The multi-pedal-controlled caster according to claim 2, wherein the main body support has two positioning surfaces, wherein the two positioning surfaces allow a limiting portion of the multifunctional pedal and a limiting portion of the auxiliary braking member to abut against.

16. The multi-pedal-controlled caster according to claim 3, wherein the main body support has two positioning surfaces, wherein the two positioning surfaces allow a limiting portion of the multifunctional pedal and a limiting portion of the auxiliary braking member to abut against.

17. The multi-pedal-controlled caster according to claim 2, wherein the first inner tooth member and the second inner tooth member are in a shape of a round cover, the first inner tooth member and the second inner tooth member are arranged away from each other, rectangular penetrating holes are formed in centers of the first inner tooth member and the second inner tooth member, the rectangular penetrating holes are sleeved on the connecting rod to realizing fixing of the first inner tooth member and the second inner tooth member relative to the connecting rod in a circumferential direction, the first inner tooth member is provided with two first recess portions in the circumferential direction, and the second inner tooth member is provided with a plurality of second recess portions in the circumferential direction, to form a serrated shape.

18. The multi-pedal-controlled caster according to claim 3, wherein the first inner tooth member and the second inner tooth member are in a shape of a round cover, the first inner tooth member and the second inner tooth member are arranged away from each other, rectangular penetrating holes are formed in centers of the first inner tooth member and the second inner tooth member, the rectangular penetrating holes are sleeved on the connecting rod to realizing fixing of the first inner tooth member and the second inner tooth member relative to the connecting rod in a circumferential direction, the first inner tooth member is provided with two first recess portions in the circumferential direction, and the second inner tooth member is provided with a plurality of second recess portions in the circumferential direction, to form a serrated shape.

19. The multi-pedal-controlled caster according to claim 2, wherein the multi-pedal-controlled caster further comprises a bottom decorative cover, wherein the bottom decorative cover is locked at a bottom of the main body support.

20. The multi-pedal-controlled caster according to claim 3, wherein the multi-pedal-controlled caster further comprises a bottom decorative cover, wherein the bottom decorative cover is locked at a bottom of the main body support.

21. The multi-pedal-controlled caster according to claim 2, wherein the connecting rod is sleeved with a bearing rotatably connected to the main body support, and the bearing is limited and sealed by means of a sealing ring;
    two connecting plates arranged at an interval are arranged at a lower portion of the first warping plate, through holes are formed in the two connecting plates, channels allowing the two connecting plates to penetrate into are formed in the second warping plate, hole channels are formed in walls on two sides of the channels, and the first pivot member penetrates through the through holes and the hole channels; and
    penetrating holes allowing the second pivot member to penetrate through are formed in the oriented reset pedal and the brake releasing reset pedal respectively.

22. The multi-pedal-controlled caster according to claim 3, wherein the connecting rod is sleeved with a bearing rotatably connected to the main body support, and the bearing is limited and sealed by means of a sealing ring;
    two connecting plates arranged at an interval are arranged at a lower portion of the first warping plate, through holes are formed in the two connecting plates, channels allowing the two connecting plates to penetrate into are formed in the second warping plate, hole channels are formed in walls on two sides of the channels, and the first pivot member penetrates through the through holes and the hole channels; and
    penetrating holes allowing the second pivot member to penetrate through are formed in the oriented reset pedal and the brake releasing reset pedal respectively.

\* \* \* \* \*